US012169246B2

(12) United States Patent
Narula et al.

(10) Patent No.: US 12,169,246 B2
(45) Date of Patent: Dec. 17, 2024

(54) SYSTEM AND METHOD FOR PERIPHERAL DEVICE LOCATION USING MULTIPLE HIGH ACCURACY DISTANCE MEASUREMENTS WITH INTEGRATED SYSTEM ANTENNAS

(71) Applicant: Dell Products, LP, Round Rock, TX (US)

(72) Inventors: Harpreet S. Narula, Austin, TX (US); Suresh K. Ramasamy, Cedar Park, TX (US); Liam B. Quinn, Austin, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 550 days.

(21) Appl. No.: 17/511,956

(22) Filed: Oct. 27, 2021

(65) Prior Publication Data

US 2023/0129726 A1  Apr. 27, 2023

(51) Int. Cl.
| | | |
|---|---|---|
| G01S 13/84 | (2006.01) | |
| G01S 5/00 | (2006.01) | |
| G01S 5/02 | (2010.01) | |
| G01S 7/02 | (2006.01) | |
| G01S 7/35 | (2006.01) | |
| G01S 13/06 | (2006.01) | |
| H04B 17/345 | (2015.01) | |
| H04W 4/80 | (2018.01) | |

(52) U.S. Cl.
CPC ............ *G01S 5/0284* (2013.01); *G01S 13/06* (2013.01); *H04W 4/80* (2018.02)

(58) Field of Classification Search
None
See application file for complete search history.

(56) References Cited

U.S. PATENT DOCUMENTS

| | | | |
|---|---|---|---|
| 8,400,959 B2* | 3/2013 | Doi .................... | H04W 56/001 |
| | | | 370/324 |
| 10,206,194 B1* | 2/2019 | Haartsen ............... | H04W 8/005 |
| 11,010,996 B2* | 5/2021 | Stitt ....................... | H01Q 13/10 |
| 11,122,389 B2* | 9/2021 | Smith ..................... | H04W 4/40 |
| 11,301,194 B2* | 4/2022 | Kurasawa ............. | G06F 3/1229 |
| 11,321,029 B2* | 5/2022 | Konji ..................... | G06F 3/1236 |
| 11,438,200 B2* | 9/2022 | Wu ......................... | H03D 7/165 |
| 11,470,450 B2* | 10/2022 | Zand ..................... | G01S 13/765 |
| 11,522,574 B1* | 12/2022 | Ranjbar ................. | H04B 1/403 |
| 11,550,023 B2* | 1/2023 | Grabbe ................. | G01S 5/0284 |
| 11,564,197 B2* | 1/2023 | Ogawa ................... | H04W 4/80 |
| 11,595,783 B2* | 2/2023 | Li ........................... | H04W 4/023 |

(Continued)

*Primary Examiner* — Tuan A Tran
(74) *Attorney, Agent, or Firm* — Prol Intellectual Property Law, PLLC; H. Kenneth Prol

(57) ABSTRACT

An information handling system is disclosed and includes a processor, a memory, a power management unit (PMU), at least two antennas, and a wireless interface operatively coupled to the at least two antennas. The processor may execute code instructions for a distance and direction detection module therein configured to enable phase-based ranging with narrow band tone exchange, to add at least one constant tone duration to a wireless data signal frame, to monitor for nearby peripheral devices, and to measure at least two distances between each of the at least two antennas at the information handling system and a nearby peripheral device using switching between the at least two antennas.

20 Claims, 10 Drawing Sheets

(56) References Cited

U.S. PATENT DOCUMENTS

| | | | | |
|---|---|---|---|---|
| 11,650,307 B2* | 5/2023 | Zand | ............... | G01S 7/023 |
| | | | | 342/125 |
| 11,729,040 B2* | 8/2023 | Zand | ............... | H04W 64/006 |
| | | | | 375/262 |
| 11,737,023 B2* | 8/2023 | Narula | ............... | H04W 4/80 |
| | | | | 455/572 |
| 2020/0137712 A1* | 4/2020 | Yu | ............... | G01S 13/765 |

* cited by examiner

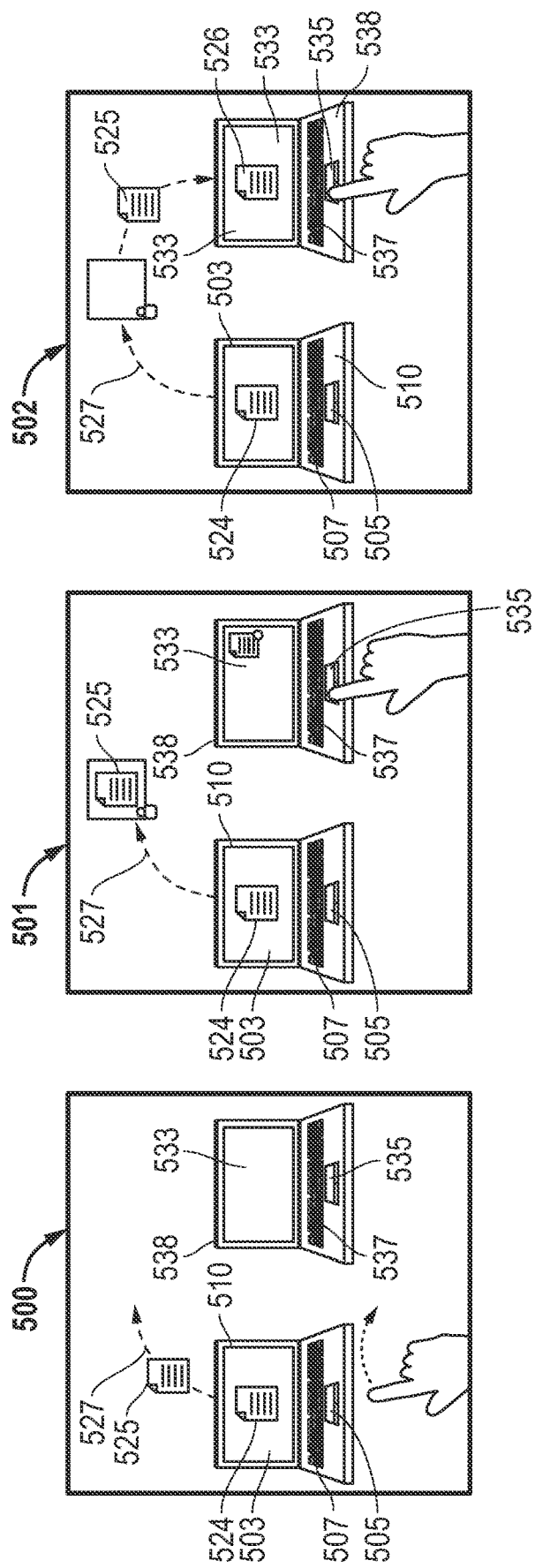

SYSTEM AND METHOD FOR PERIPHERAL DEVICE LOCATION USING MULTIPLE HIGH ACCURACY DISTANCE MEASUREMENTS WITH INTEGRATED SYSTEM ANTENNAS

FIELD OF THE DISCLOSURE

The present disclosure generally relates to an information handling system having the capability to be operatively coupled to one or more peripheral devices. More particularly, the present disclosure relates to determining a distance and direction of a peripheral device relative to an information handling system.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities.

A typical information handling system may have the capability to connect a variety of peripheral devices. Determining the location of the peripheral devices relative to the information handling system may be quite useful. As such, there is a need to for a system and method of locating peripheral devices relative to an information handling system using one or more integrated system antennas within the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 5A, FIG. 5B, and FIG. 5C are a pictorial sequence illustrating a method of transferring files from an information handling system to a peripheral device according to an embodiment of the present disclosure;

The use of the same reference symbols in different drawings may indicate similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

A typical information handling system may have the capability to be operably coupled to several peripheral devices, i.e., remote video display devices, projectors, other information handling systems, smart phones, etc. Also, a typical information handling system may include several antennas. The systems and method steps described herein leverage the antennas integrated into the information handling system in order to determine a distance and direction to a peripheral device whether or not it is operably coupled to the information handling system. The distance and direction information, along with certain user gestures, may be used to facilitate the quick transfer of files from the information handling system to another information handling system. Moreover, the distance and direction information, along with certain user gestures, may be used to facilitate sharing a screen from the information handling system to another information handling system. Additionally, the distance and direction information may be used to facilitate remotely logging into an information handling system, or other system, via a smart device equipped with one or more biometric sensors. Other direction or distance based applications may also be executed on the information handling system for operations with a nearby peripheral device and which may utilize distance or direction information determined according to various embodiments herein. For example, embodiments of direction or distance based applications may include file sharing, file transfers, content sharing, screen sharing, remote device authentication among others.

Figure 1:
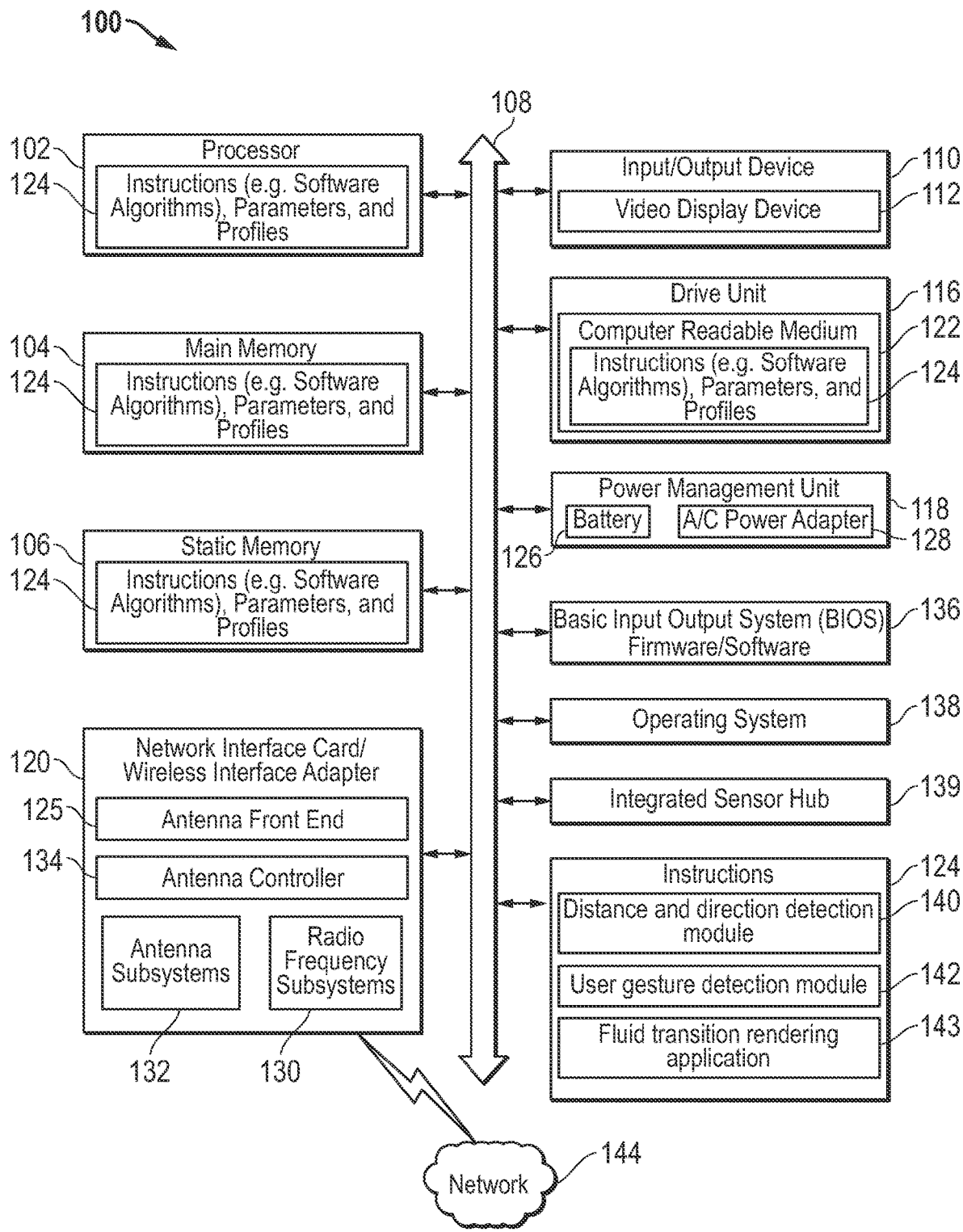
FIG. 1 is a block diagram illustrating an information handling system according to an embodiment of the present disclosure.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, mobile device (e.g., personal digital assistant (PDA) or smart phone), server (e.g., blade server or rack server), a consumer electronic information handling system, a network server or storage device, a network router, switch, or bridge, wireless router, or other network communication information handling system, a network connected device (cellular telephone, tablet information handling system, etc.), IoT computing device, wearable computing device, a set-top box (STB), a mobile device, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic information handling systems that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g., random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

Information handling system 100 can include devices or modules that embody one or more of the devices or execute instructions for the one or more systems and modules described above, and operates to perform one or more of the methods described above. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, computer readable medium 122 storing instructions 124 of an antenna selection algorithm, and drive unit 116 (volatile (e.g., random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices.

As shown, the information handling system 100 may further include a video display device 110. The video display device 110 in an embodiment may function as a liquid crystal display (LCD), an organic light emitting diode (OLED), a flat panel display, or a solid-state display. Additionally, the information handling system 100 may include an alpha numeric input device 112, such as a keyboard, and/or a cursor control device, such as a mouse, touchpad, or gesture or touch screen input device. The information handling system 100 can also include a disk drive unit 116.

The network interface device shown as wireless interface adapter 120 can provide connectivity to a network 144, e.g., a wide area network (WAN), a local area network (LAN), wireless local area network (WLAN), a wireless personal area network (WPAN), a wireless wide area network (WWAN), or another network. In an embodiment, the WAN, WWAN, LAN, and WLAN may each include an access point used to operatively couple the information handling system 100 to a network. In a specific embodiment, the network 144 may include macro-cellular connections or small cell connections via one or more base stations 162 or may include wireless access points 160 (e.g., Wi-Fi or WiGig) for WLAN wireless links. Further, wireless link connections may be peer-to-peer, such as via a WPAN wireless link to interconnect plural information handling systems, one of which may be considered in the embodiments herein to be a peripheral device. In other embodiments, WPAN wireless links may also provide wireless links between an information handling system and one or more peripheral devices. Peripheral devices may include other information handling systems or one or more input/output (I/O) devices, displays, or other external electronic devices to receive data from or transmit data to the information handling system.

Connectivity may be via wired or wireless connection. Wireless interface adapter 120 may include one or more radio frequency subsystems 130 with transmitter/receiver circuitry, modem circuitry, one or more radio frequency front end circuits, one or more wireless controller circuits, amplifiers, antenna systems 132 and other circuitry of the radio frequency subsystem 130 such as one or more antenna ports used for wireless communications via multiple radio access technologies. Each radio frequency subsystem 130 may communicate with one or more wireless technology protocols. The radiofrequency subsystem 130 may contain individual subscriber identity module (SIM) profiles for each technology service provider and their available protocols for any operating subscriber-based radio access technologies such as cellular LTE communications.

The wireless interface adapter 120, also known as a network interface device, may also include antenna systems 132 which may include any number of tunable antenna systems for use with the system and methods disclosed herein. Additional antenna system modification circuitry (not shown) may also be included with the wireless interface adapter 120 to implement coexistence control measures via an antenna controller 134 as described in various embodiments of the present disclosure.

In some aspects of the present disclosure, the wireless interface adapter 120 may operate two or more wireless links. In a further aspect, the wireless interface adapter 120 may operate the two or more wireless links with a single, shared communication frequency band such as with the 5G standard relating to unlicensed wireless spectrum for small cell 5G operation or for unlicensed Wi-Fi WLAN operation in an example aspect. For example, 2.4 GHz/2.5 GHz or 5 GHz wireless communication frequency bands may be apportioned under the 5G standards for communication on either small cell WWAN wireless link operation or Wi-Fi WLAN operation. In some embodiments, the shared, wireless communication band may be transmitted through one or a plurality of antennas or antennas may be capable of operating at a variety of frequency bands.

The wireless interface adapter 120 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, or similar wireless standards may be used. Wireless interface adapter 120 may connect to any combination of WWAN wireless connections including 2G, 2.5G, 3G, 4G, 5G or the like from one or more service providers. Utilization of radiofrequency communication bands according to several example embodiments of the present disclosure may include bands used with the WLAN standards and WWAN carriers which may operate in both licensed and unlicensed spectrums. For example, both WLAN and WWAN may use ISM bands and the Unlicensed National Information Infrastructure (U-NII) band. Both WLAN and WWAN may operate under 3GPP and IEEE 802.11 standards in the 2.4/2.5 GHz frequency band, the ~5 GHz frequency band, or higher frequency bands at ~6-7 GHz or higher. WLAN may include Wi-Fi bands such as those specified under IEEE 802.11 a/h/j/n/ac/ax. WLAN, for example, may operate at a 2.4 GHz band, 5 GHz band, and/or a 6-7 GHz band according to, for example, Wi-Fi, Wi-Fi 6, or Wi-Fi 6E standards. WWAN may operate in a number of bands, some of which are proprietary but may include a wireless communication frequency band. For example, low-band 5G may operate at frequencies similar to 4G standards at 600-850 MHz. Mid-band 5G may operate at frequencies between 1.8 and 6 GHz. Additionally, high-band 5G frequencies may operate at 25 to 39 GHz and even higher. In additional examples, WWAN carrier licensed bands may operate at the new radio frequency range 1 (NRFR1), NFRF2, bands, and other known bands. Each of these frequencies used to communicate over the network 144 may be based on the radio access network (RAN) standards that implement, for example, eNodeB or gNodeB hardware connected to mobile phone networks (e.g., cellular networks) used to communicate with the information handling system 100. In the example embodiment, mobile device 100 may also include both unlicensed wireless RF communication capabilities as well as licensed wireless RF communication capabilities.

The wireless interface adapter 120 may operate in accordance with a WPAN wireless data communication standard under some embodiments of the present disclosure. For example, WPAN wireless data communication may operate in the 2.4-2.48 GHz range of ISM bands. The WPAN wireless data communication standard may be, for example, the Bluetooth® (BT) standard as set forth by the Bluetooth® Special Interest Group (SIG) and standardized under IEEE 802.15. In a particular embodiment, a Bluetooth Low Energy (BLE) standard may be used according to the disclosures herein to conduct peer-to-peer communications among information handling systems or between an information handling system and one or more peripheral devices (which may include another information handling system). The BLE technology is a low energy WPAN that permits utilization of similar frequency ranges, such as 2.4 GHz used with regular Bluetooth® under the IEEE 802.15 standard and also with Wi-Fi standards under IEEE 802.11. Thus, the BLE technology, as supported by the OS in an information handling system, may generate wireless connectivity among one or more information handling systems or peripheral devices, including low energy peripheral devices. Further, the BLE standard permits utilization with common wireless interface adapters 120, radios 130, and antennas 132 as Wi-Fi and, thus, may be shared antenna systems 130.

The wireless interface adapter 120 can represent an add-in card, wireless network interface module that is integrated with a main board of the information handling system or integrated with another wireless network interface capability, or any combination thereof. In an embodiment the wireless interface adapter 120 may include one or more radio frequency subsystems 130 including transmitters and wireless controllers for connecting via a multitude of wireless links. In an example embodiment, an information handling system may have an antenna system transmitter for 5G small cell WWAN, Wi-Fi WLAN, BT WPAN, or WiGig connectivity and one or more additional antenna system transmitters for wireless communication. The radio frequency subsystems 130 may include a radio and wireless controller to manage authentication, pairing, connectivity, communications, power levels for transmission, buffering, error correction, baseband processing, and other functions of the wireless interface adapter 120. The radio frequency subsystem 130 may also be referred to as a radio herein.

The information handling system 100 may further include a power management unit (PMU) 118 (a.k.a. a power supply unit (PSU)). The PMU 118 may manage the power provided to the components of the information handling system 100 such as the processor 102, a cooling system, one or more drive units 116, a graphical processing unit (GPU), a video/graphic display device or other input/output devices 112, and other components that may require power when a power button has been actuated by a user. In an embodiment, the PMU 118 may monitor power levels and be electrically coupled to the information handling system 100 to provide this power and coupled to bus 108 to provide or receive data or instructions. The PMU 118 may regulate power from a power source such as a battery 126 or A/C power adapter 128. In an embodiment, the battery 126 may be charged via the A/C power adapter 128 and provide power to the components of the information handling system 100 when A/C power from the A/C power adapter 128 is removed.

Information handling system 100 includes one or more of an operating system (OS) 138, and basic input/output system (BIOS) firmware/software 136 or application programs that may be executable instructions 124 executed at any processor 102 and stored at one or more memory devices 104, 106, or 116. BIOS firmware/software 136 functions to initialize information handling system 100 on power up, to launch an OS 138, and to manage input and output interactions between the OS 138 and the other elements of information handling system 100. In a particular embodiment, BIOS firmware/software 136 resides in memory 104, and include machine-executable code that is executed by processor 102 to perform various functions of information handling system 100 as described herein. In another embodiment (not illustrated), application programs and BIOS firmware/software 136 reside in another storage medium of information handling system 100. For example, application programs and BIOS firmware/software 136 can reside in drive 116, in a ROM (not illustrated) associated with information handling system 100, in an option-ROM (not illustrated) associated with various devices of information handling system 100, in a storage system (not illustrated) associated with network channel of a wireless interface adapter 120, in another storage medium of information handling system 100, or a combination thereof. Executable code instructions 124 for application programs and BIOS firmware/software 136 can each be implemented as single programs, or as separate programs carrying out the various features as described herein.

In an embodiment, the information handling system 100 may include an integrated sensor hub 139. The integrated sensor hub 139 may further include sensors such as, a magnetometer, an orientation sensor, an accelerometer, a gyroscope, a proximity sensor, a hinge sensor, a light sensor, and a camera, an infrared sensor, a Hall effect sensor, or a GPS system among other sensors. In an embodiment, these variety of sensors may also include an accelerometer, a gyroscope, an orientation sensor in addition to these other sensors. These sensors may provide data about the orientation and position of the information handling system 100 to the distance and direction detection module 140 for determination of distance and direction of one or more detected peripheral devices relative to an orientation or position of the information handling system 100 in an example embodiment. In another example embodiment, the orientation and position of the information handling system 100 may include information about the location, orientation and position of a plurality of integrated antennas 132 and their known distance from one another as used to determine direction and distance of one or more peripheral devices by the distance and direction detection module 140. The antenna controller 134 may configure a primary antenna 132 and second antenna 132 and may perform ranging in order to determine the distance between the information handling system primary and second antennas and one or more peripheral devices. The distance or range of the peripheral device from the primary and secondary antenna 132 may be calculate using the direction, or directionality zone, to the target peripheral device's antenna. A reference plane for direction may be determined from the location of the plural antennas within the information handling system and the determined from orientation and position of the information handling system as provided by sensor data from the integrated sensor hub 139. An orthogonal plane may be configured as a reference plane for the information handling system to be utilized by the distance and direction detection module executing the peripheral device locationing system.

As shown in FIG. 1, the information handling system 100 may further include a distance and direction detection module 140, a user gesture detection module 142, and a fluid transition rendering application 143. As described in greater detail below, the distance and direction detection module 140 may use integrated antennas 132 within the information handling system 100 in order to determine the distance and direction to one or more peripheral devices, including other information handling systems, whether or not the peripheral device is operably coupled via BT pairing to the information handling system 100. The user gesture detection module 142 may detect one or more user gestures that may activate, or otherwise trigger, certain operations at the information handling system 100. The user gesture detection module 142 may be operable coupled to an input/output device 100, e.g., a touch pad or touch screen, and may detect user gestures via the input/output device 100. For example, the gestures may include a single finger detected at a designated corner/side of a touch pad or touchscreen, two fingers at a designated corner/side of a touch pad or touchscreen, three fingers at a designated corner/side of a touch pad or touchscreen. In other examples, a gesture may include a single finger swipe along a direction or toward a designated edge of a touch pad or touchscreen, a two finger swipe along a direction or toward a designated edge of a touch pad, a three finger swipe along a direction or toward a designated edge of a touch pad, etc. The user gestures may actuate certain operations at the information handling system 100 when matched with a determined direction or directionality zone for a peripheral device in some embodiments. In additional embodiments, a range distance may be required to fall within a certain distance for actuation of certain operations. These direction or range based functions may include a file sharing or file transfer to an adjacent peripheral device, a content share or screen share to an adjacent peripheral device, or a remote peripheral device login utilizing biometrics that may require a specified directionality or range for security among other direction or range based software application functions with a detected nearby peripheral device according to various embodiments.

In an embodiment, the information handling system 100 may wirelessly interact or connect to a nearby peripheral device that may include other information handling systems via BT or another WPAN wireless protocol. In particular, the information handling system 100 may use plural dedicated BT antennas 132, antennas shared with WLAN, or a combination to determine in conjunction with phase-based ranging a distance between each of the plural antennas 132 and a WPAN antenna on a peripheral device. The antenna front end 125 may include an antenna switch to switch between the plural antennas for phase-based ranging transmissions to a peripheral device from a WPAN radio frequency subsystem 130 in some embodiments herein. In a particular embodiment, the plural antennas 132 and radio frequency subsystem 130 may be shared and capable to operate in both a WPAN protocol and a WLAN protocol. For example, a coexistence algorithm is used to interleave Wi-Fi and Bluetooth data for primary antenna access versus a second antenna, both of which may be shared between Bluetooth and Wi-Fi. Switching between a primary and secondary antennas 132 may be conducted with an antenna switch in the antenna front end 125. Further, a dedicated coexistence radio interface may be connected to the antenna controller in order to notify of Bluetooth/Wi-Fi coexistent operation and to aid with Wi-Fi 2×2 antenna selection and switching as well as interleaving BT and Wi-Fi signals on a single antenna that may be active for BT operation but is also shared with Wi-Fi operation. The wireless interface adapter 120 may communicate or connect to peripheral devices including other information handling systems via the WPAN protocol such as BT on either antenna of the plural antennas in some embodiments and may be switched between plural antennas. In various embodiments, the plural antennas may be dedicated BT antennas or may be shared BT/Wi-Fi antennas according to the above.

In another embodiment, the information handling system 100 may connect to an external wireless network 144. In particular, the wireless network 144 may have a wireless mesh architecture in accordance with mesh networks described by the wireless data communications standards or similar standards in some embodiments but not necessarily in all embodiments. The wireless interface adapter 120 may connect to the external wireless network 144 via a WPAN, WLAN, WWAN or similar wireless switched Ethernet connection in some embodiments. The wireless data communication standards set forth protocols for communications and routing via access points, as well as protocols for a variety of other operations. Other operations may include handoff of client devices moving between nodes, self-organizing of routing operations, or self-healing architectures in case of interruption.

In some embodiments, software, firmware, dedicated hardware implementations such as application specific integrated circuits, programmable logic arrays and other hardware information handling systems can be constructed to implement one or more of the methods described herein. Applications that may include the apparatus and systems of various embodiments can broadly include a variety of electronic and computer systems. One or more embodiments described herein may implement functions using two or more specific interconnected hardware modules or information handling systems with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions, parameters, and profiles 124 or receives and executes instructions, parameters, and profiles 124 responsive to a propagated signal; so that a device connected to a network 128 can communicate voice, video or data over the wireless network 144. Further, the instructions 124 may be transmitted or received over the wireless network 144 via the network interface device, i.e., the wireless interface adapter 120.

The wireless interface adapter 120 represents a network interface card (NIC) disposed within information handling system 100, on a main circuit board of the information handling system, integrated onto another component such as processor 102, in another suitable location, or a combination thereof. The wireless interface adapter 120 can include another information handling system, a data storage system, another network, a grid management system, another suitable resource, or a combination thereof. In an embodiment, the wireless interface adapter 120 may operably connect to the network 144. The connection to network 144 may be wired or wireless.

The network interface device shown as wireless interface adapter 120 can provide connectivity to the network 144, such as a wide area network (WAN), a local area network (LAN), wireless local area network (WLAN), a wireless personal area network (WPAN), a wireless wide area network (WWAN), or another network. Connectivity may be via wired or wireless connection. The wireless interface adapter 120 may include an adaptive massive MIMO Multiplexer with transmitter/receiver circuitry, wireless controller circuitry, amplifiers and other circuitry for wireless communications. The wireless interface adapter 120 may also include antenna systems 132 as described above which may be tunable antenna systems for use with the system and methods disclosed in the embodiments herein. The antenna controller 134 may also include wireless controllers to manage authentication, connectivity, pairing, communications, power levels for transmission, buffering, error correction, baseband processing, and other functions of the wireless interface adapter 120.

The information handling system 100 can include a set of instructions 124 that can be executed to cause the computer system to perform any one or more of the methods or computer-based functions disclosed herein. For example, instructions 124 may execute an antenna selection algorithm, various software applications, software agents, or other aspects or components. Various software modules comprising application instructions 124 may be coordinated by an operating system (OS), and/or via an application programming interface (API). An example operating system may include Windows®, Android®, and other OS types known in the art. Example APIs may include Win 32, Core Java API, or Android APIs.

The disk drive unit 116 and may include a computer-readable medium 122 in which one or more sets of instructions 124 such as software can be embedded to be executed by the processor 102 and antenna controller 134 to perform the processes described herein. Similarly, main memory 104 and static memory 106 may also contain a computer-readable medium for storage of one or more sets of instructions, parameters, or profiles 124 including one or more look-up tables and/or one or more antenna selection algorithms 164. The disk drive unit 116 or static memory 106 also contain space for data storage. Further, the instructions 124 may embody one or more of the methods or logic as described herein. In a particular embodiment, the instructions, parameters, and profiles 124 may reside completely, or at least partially, within the main memory 104, the static memory 106, and/or within the disk drive 116 during execution by the processor 102 or an antenna controller 134 of information handling system 100. The main memory 104 and the processor 102 also may include computer-readable media.

Main memory 104 or other memory of the embodiments described herein may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The antenna selection algorithm 164 and sideband serial messaging protocol 142 and the drive unit 116 may include access to a computer-readable medium 122 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include software, including firmware embedded at a device, such as an Intel® Core class processor, AMD® brand processors, ARM® brand processors, Qualcomm (ID Snapdragon processors, or other processors and chipsets, or other such devices, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
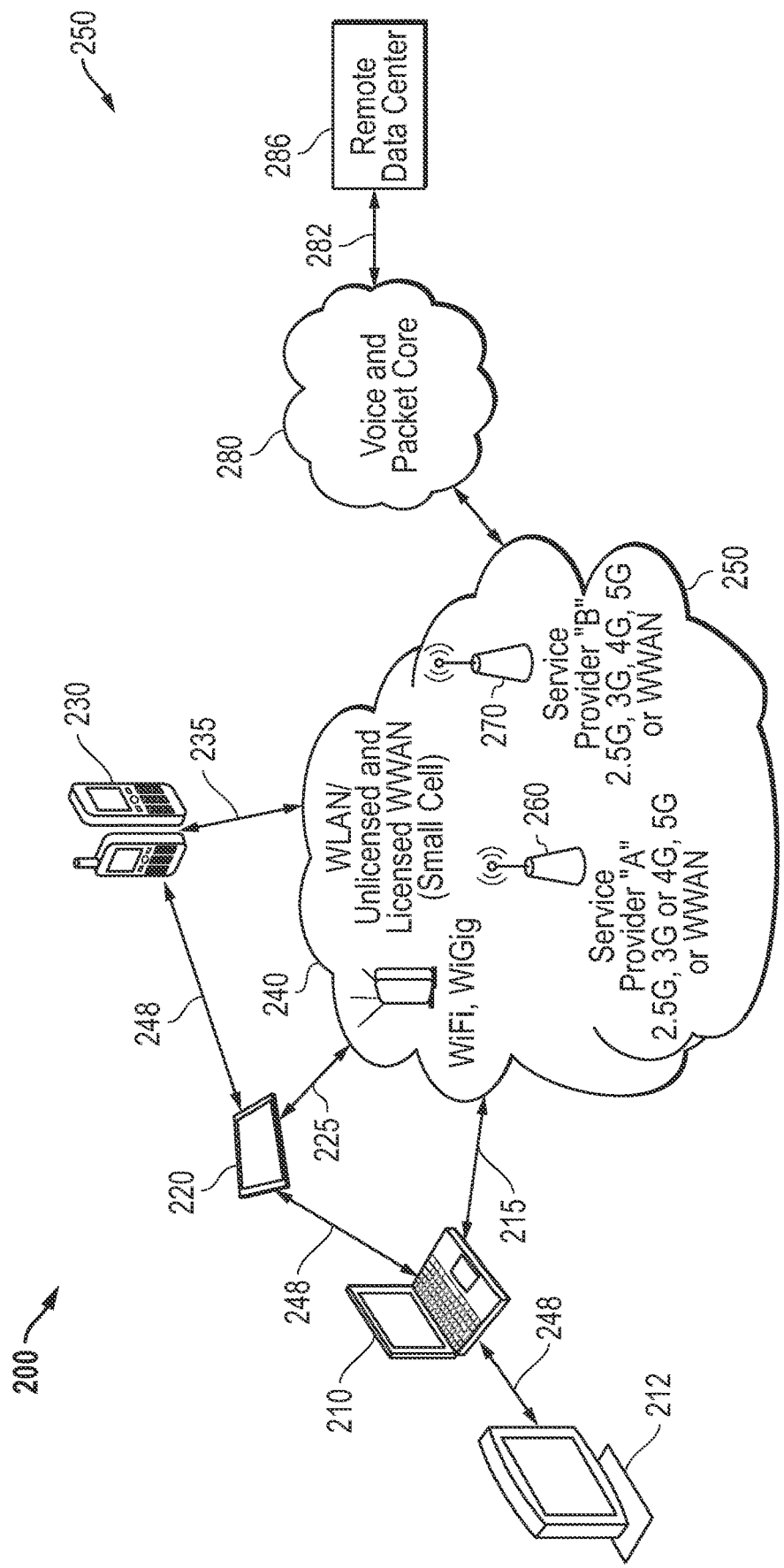
FIG. 2 is a block diagram of a network environment offering several communication protocol options and mobile information handling systems according to an embodiment of the present disclosure.

FIG. 2 illustrates a network 200 that can include one or more information handling systems 210, 220, 230. The information handling systems 210, 220, 230 shown in FIG. 2 may be similar to the information handling system 100 described in connection with FIG. 1. In a particular embodiment, network 200 includes networked mobile devices 210, 220, and 230, wireless network access points, and multiple wireless connection link options. A variety of additional computing resources of network 200 may include client mobile devices, data processing servers, network storage devices, local and wide area networks, or other resources as needed or desired. As partially depicted, information handling systems 210, 220, 230 may be a laptop computer, tablet computer, 360-degree convertible systems, wearable computing devices, or a smart phone device. These mobile devices 210, 220, and 230, may access a wireless local network 240, or they may access a macro-cellular network 250. For example, the wireless local network 240 may be available through an access point 245 and may operate a wireless local area network (WLAN), a wireless personal area network (WPAN), or a wireless wide area network (WWAN). The access point 245 may be a WLAN access point for Wi-Fi communications in an embodiment. In an example embodiment, LTE-LAA WWAN may operate with a small-cell WWAN wireless access point option.

WPAN connections 248 may be BT connections discussed in embodiments herein or Wi-Fi Direct Connection in some embodiments. Where the WPAN connections 248 are BT connections they may further be, according to some embodiments herein, BLE connections and operate to advertise, discovery, and establish connections and pairing among one or more information handling systems 210, 220, or 230 or any number of other peripheral devices 212 such as the display device depicted in FIG. 2. In embodiments herein, a user information handling system operating a distance and direction detection module with instructions for a peripheral device locationing system may be, for example, information handling system 210 and peripheral devices may include display device 212 and another information handling system such as 220. In particular embodiments, wireless links 248 may include unpaired/unconnected advertising and discovery BLE beacon frame communications between information handling system 210 and peripheral devices 212 and 220 or may include established, paired/connected BLE beacon frame communications with data channels. These wireless links and the BLE beacon frame communications may be used with a duration of narrow-band constant tone added of a particular duration to determine based on reflected or returned constant tone communication a frequency phase shift of the constant tone to determine range between the BLE antenna integrated into the user information handling system and a BLE antenna at the peripheral device 212 or 220. This phase-based ranging using links 248 is described further in embodiments herein.

Components of a WLAN may be connected by wireline or Ethernet connections to a wider external network such as a voice and packet core 280. For example, wireless network access points 245 or base stations 260, 270 may be connected to a wireless network controller and an Ethernet switch. Wireless communications across wireless local network 240 may be via standard protocols such as IEEE 802.11 Wi-Fi, IEEE 802.11ad WiGig, IEEE 802.15 WPAN, IEEE 802.11ax-2021, (e.g., Wi-Fi 6 and 6E, 6 GHz technologies), or emerging 5G small cell WWAN communications such as gNodeB, eNodeB, or similar wireless network protocols and access points. Alternatively, other available wireless links within network 200 may include macro-cellular connections 250 via one or more service provider base stations 260 and 270. As described herein, a plurality of antennas may be operatively coupled to any of the macro-cellular connections 250 via one or more service providers or to the wireless local area networks (WLANs) selectively based on the SAR data, RSSI data, configuration data, system operation and connection metrics, and antenna mounting locations (e.g., spatial locations within the information handling system) associated with each information handling systems 210, 220, 230 as described herein. Service provider macro-cellular connections may include 2G standards such as GSM, 2.5G standards such as GSM EDGE and GPRS, 3G standards such as W-CDMA/UMTS and CDMA 2000, 4G standards, or emerging 5G standards including WiMAX, LTE, and LTE Advanced, LTE-LAA, small cell WWAN, and the like.

Wireless local network 240 and macro-cellular network 250 may include a variety of licensed, unlicensed or shared communication frequency bands as well as a variety of wireless protocol technologies ranging from those operating in macrocells, small cells, picocells, or femtocells. As described herein, utilization of RF communication bands according to several example embodiments of the present disclosure may include bands used with the WLAN standards and WWAN carriers which may operate in both licensed and unlicensed spectrums. Each of these frequencies used to communicate over the network 250 may be based on the radio access network (RAN) standards that implement, for example, eNodeB or gNodeB hardware connected to mobile phone networks (e.g., cellular networks) used to communicate with the information handling system 210, 220, or 230. In the example embodiment, mobile device 210, 220, or 230 may also include both unlicensed wireless RF communication capabilities as well as licensed wireless RF communication capabilities. For example, licensed wireless RF communication capabilities may be available via a subscriber carrier wireless service operating the cellular networks. With the licensed wireless RF communication capability, an WWAN RF front end of the information handling system 210, 220, or 230 may operate on a licensed WWAN wireless radio with authorization for subscriber access to a wireless service provider on a carrier licensed frequency band. WLAN such as Wi-Fi (e.g., Wi-Fi 6) may be unlicensed.

In some embodiments according to the present disclosure, a networked mobile device 210, 220, or 230 may have a plurality of wireless network interface systems capable of transmitting simultaneously within a shared communication frequency band. That communication within a shared communication frequency band may be sourced from different protocols on parallel wireless network interface systems or from a single wireless network interface system capable of transmitting and receiving from multiple protocols. Similarly, a single antenna or the plurality of antennas in each information handling system 210, 220, 230 may be used on each of the wireless communication devices such as according to embodiments herein and may be suited to plural RF bands. Example competing protocols may be local wireless network access protocols such as Wi-Fi/WLAN, WiGig, and small cell WWAN in an unlicensed, shared communication frequency band. Shared frequency bands within a local portion of wireless network 250 access points for Wi-Fi or WiGig as well as small cell WWAN connectivity in emerging 5G technology may be used. This may create situations where a plurality of antenna systems are operating on a mobile device 210, 220 or 230 via concurrent communication wireless links on WPAN, WLAN and WWAN radios and antenna systems. In some embodiments, WPAN and WLAN radios and antenna systems may be shared as described in embodiments herein. In some embodiments, concurrent wireless links may operate within the same, adjacent, or otherwise similar communication frequency bands and may be required to utilize spaced antennas. The antennas may be a transmitting antenna that includes high-band, medium-band, low-band, and unlicensed band transmitting antennas in embodiments herein.

The voice and packet core network 280 shown in FIG. 2 may contain externally accessible computing resources and connect to a remote data center 286. The voice and packet core network 280 may contain multiple intermediate web servers or other locations with accessible data (not shown). The voice and packet core network 280 may also connect to other wireless networks similar to 240 or 250 and additional mobile devices such as 210, 220, 230 or similar connected to those additional wireless networks. Connection 282 between the wireless network 240 and remote data center 286 or connection to other additional wireless networks may be via Ethernet or another similar connection to the worldwide-web, a WAN, a LAN, another WLAN, or other network structure. Such a connection 282 may be made via a WLAN access point/Ethernet switch to the external network and be a backhaul connection. The access point may be connected to one or more wireless access points in the WLAN before connecting directly to a mobile device or may connect directly to one or more mobile devices 210, 220, and 230. Alternatively, mobile devices 210, 220, and 230 may connect to the external network via base station locations at service providers such as 260 and 270. These service provider locations may be network connected via backhaul connectivity through the voice and packet core network 280.

Remote data centers 286 may include web servers or resources within a cloud environment that operate via the voice and packet core 280 or other wider internet connectivity. For example, remote data centers can include additional information handling systems, data processing servers, network storage devices, local and wide area networks, or other resources as needed or desired. Having such remote capabilities may permit fewer resources to be maintained at the mobile devices 210, 220, and 230 allowing streamlining and efficiency within those devices. Similarly, remote data center permits fewer resources to be maintained in other parts of network 200.

In a particular aspect, the remote data center 286 may include an authentication server. The authentication server may authenticate information handling systems, e.g., a trusted and authenticated information handling system, based on local credentials that may be stored at the trusted and authenticated information handling system and transmitted to the remote data center 286. The remote data center 286 may also include a SIM profile provisioning server. The SIM profile provisioning server may be used to distribute SIM profiles, e.g., eSIMS, to new information handling systems as these new information handling system are brought online for the first time.

Although 215, 225, and 235 are shown connecting wireless interface adapters of mobile devices 210, 220, and 230 to wireless networks 240 or 250, a variety of wireless links are contemplated. Wireless communication may link through a wireless access point (Wi-Fi or WiGig), through unlicensed WWAN small cell base stations such as in network 240 or through a service provider tower and base stations such as that shown with service provider A 260 or service provider B 270 and in network 250. In other aspects, mobile devices 210, 220, and 230 may communicate intra-device via 248 when one or more of the mobile devices 210, 220, and 230 are set to act as an access point or even potentially an WWAN connection via small cell communication on licensed or unlicensed WWAN connections. For example, one of mobile devices 210, 220, and 230 may serve as a Wi-Fi hotspot in an embodiment. Concurrent wireless links to information handling systems 210, 220, and 230 may be connected via any access points including other mobile devices as illustrated in FIG. 2.

Figure 3:
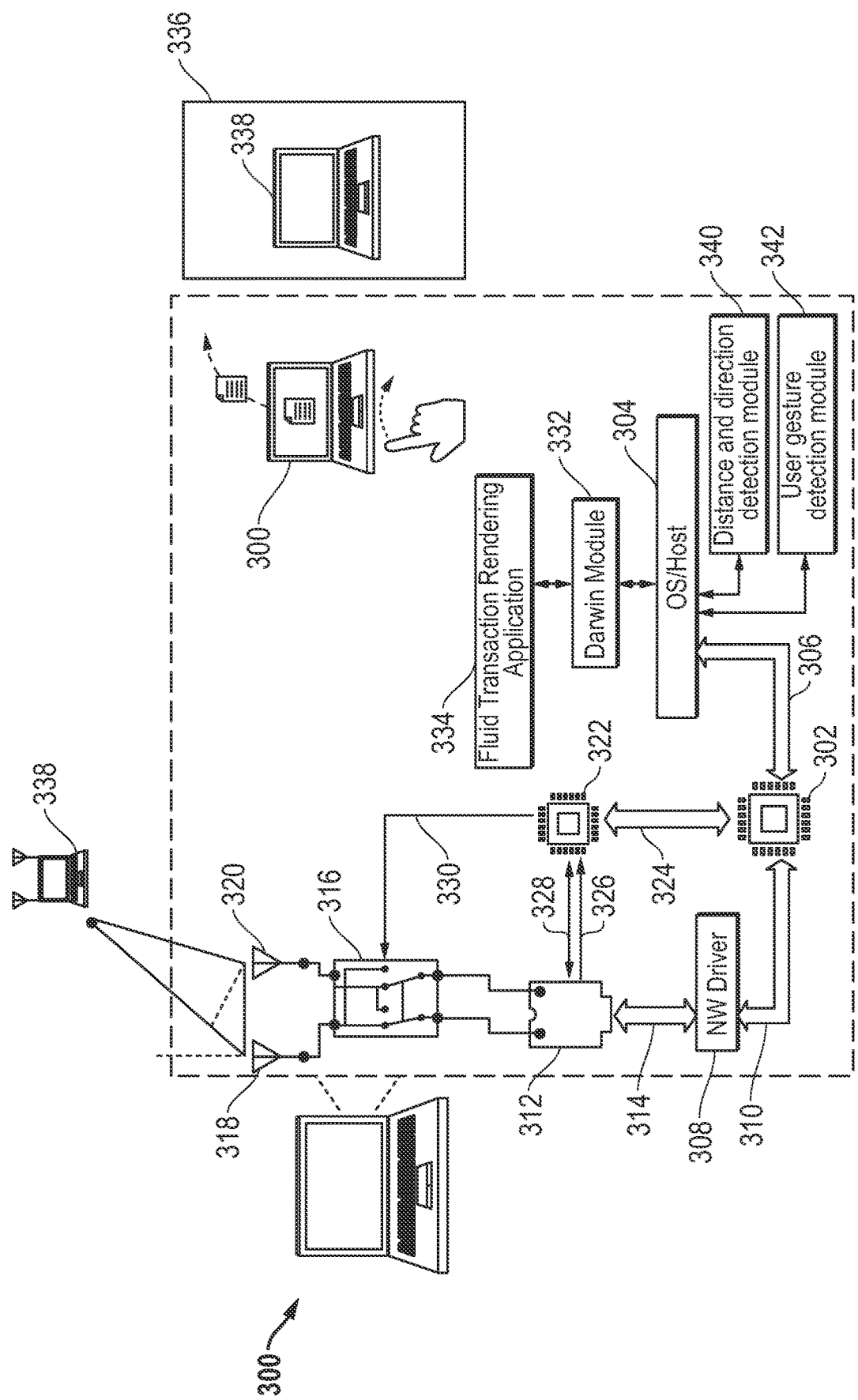
FIG. 3 is a block diagram of an information handling system according to another embodiment of the present disclosure.

Referring now to FIG. 3, another information handling system, according to an embodiment, is illustrated and is generally designated 300. The information handling system 300 may include one or more of the same elements as the information handling system 100 illustrated in FIG. 1. As illustrated, in this particular embodiment, the information handling system 300 may include a central processing unit (CPU) 302 and an operating system/host (OS/host) 304 may be operably coupled to the CPU 302 via interface 306. Alternatively, the OS/host 304 may operate on the CPU 302. As is known in the art, the OS/host 304 may be system software that may manage computer hardware, software resources. The OS/host 304 may also provide common services for computer programs operating within the information handling system 300. A network driver 308 may be operably coupled to the CPU 302 via interface 310. A radio 312 may be operably coupled to the network driver 308 via interface 314. In a particular embodiment, the radio 312 may include a Wi-Fi/BT radio. It is to be understood that the network driver 308 may act as an interface between the OS 304 and the radio 312. The network driver 308 may also act as a network controller.

In an embodiment, a switch 316 may be operably coupled to the radio 312 and in an antenna front end. The switch may be a dual pole dual thrown (DPDT) switch 316 and a first antenna 318 and a second antenna 320 may be operably coupled to the switch 316. As further illustrated, an antenna controller 322 may be operably coupled to the CPU 302 via interface 324. The antenna controller 322 may also be operably coupled to the radio 312 via interface 326. In an embodiment in which the radio 312 is a Wi-Fi/BT radio, the interface 326 may be a BT/Wi-Fi co-existence interface. Further, during operation of the one or more methods described herein, the antenna controller 322 may communicate Bluetooth constant tone exchange (BT CTE) frequency 328. The antenna controller 322 may also be operably coupled to the switch 316 via interface 328. The antenna controller 322 may transmit one or more control signals to the switch 316 via interface 330.

As further illustrated in FIG. 3, and in an embodiment according to the disclosure, the information handling system 300 may include a dynamic antenna re-configuration wireless integration (DARWIN) module 332 operably coupled to the OS/host 304. During operation of the information handling system 300, the DARWIN module 332 may be considered an additional antenna controller and as such, the DARWIN module 332 may control the operation of the first antenna 318 and the second antenna 320. FIG. 3 further shows a fluid transition rendering application 334 operably coupled to the DARWIN module 332. The fluid transition rendering application 334 may operate to show an onscreen display rendering 336 of the information handling system 300, a nearby peripheral device 338, e.g., another information handling system 338, or a direction of a nearby peripheral device 338 at least partially based on distance/direction measurements determined by the distance and direction detection module 340, as described in detail below. This rendering 336 may be presented via a display at the information handling system 300. In other embodiments, specific displayed rendering on a display device may not be required, but instead a direction or direction zone rendered relative to an I/O device such as a touchscreen of a display device, a touchpad, a keyboard, or other device may be determined and utilized for comparison with a detected gesture direction detected by a user gesture detection module 342 to indicate a target peripheral device 338. If a gesture direction matches a rendered direction of a peripheral device across a touchscreen, touchpad, relative to a keyboard, or relative to a cursor for a cursor control device such as a mouse, the gesture may be deemed as the user indicating a detected target peripheral device 338.

Thereafter, specific user gestures, detected by the user gesture detection module 342 may be used to perform distance or direction based operations with the nearby peripheral device 338. For example, a distance or direction based operation may include a software system to share or transfer files from the information handling system 300 to the nearby peripheral device 338, e.g., the other information handling system 338. In another embodiment, the user gestures may be used with a distance or direction based operation to share a screen image or other content from the information handling system 300 to the nearby peripheral device 338, e.g., the other information handling system 338. In yet another embodiment, the user gestures may be used with a distance or direction based operation to utilize an in-range peripheral device 338, e.g., the other information handling system 338, for remote peripheral device login and authentication for access to the user information handling system 300. For example, the peripheral device 338 may need to be within a range of distance and located in front of the user information handling system 300 before authentication may be allowed via biometrics or other security measures on the peripheral device as added security. Other user gestures may be used with a distance or direction based operation with peripheral device 338, e.g., the other information handling system 338, are also contemplated in other embodiments and may utilize the determined direction and distance of one or more detected peripheral devices 338 relative to the user information handling system 300 as determined by the peripheral device locationing system of the distance and direction detection module 340.

As described further herein, the peripheral device locationing system of the distance and direction detection module 340 may utilize a BLE beacon frame in advertising and discovery mode for communication of a narrow-band continuous tone exchange with one or more BLE capable antennas on peripheral device 338 in one embodiment. In another embodiment, the peripheral device locationing system of the distance and direction detection module 340 may transmit or receive a BLE beacon frame in communication channel when in locationing mode for communication of a narrow-band continuous tone exchange with one or more BLE capable antennas on peripheral device 338 in another embodiment. Exchange of the narrow-band continuous tone via the BLE beacon frames may be conducted via a first antenna 320 and phase-based ranging from a phase shift may be used by the peripheral device locationing system of the distance and direction detection module 340 to determine a first distance r1 from first antenna 320 to peripheral device 338. The peripheral device locationing system of the distance and direction detection module 340 may switch the antenna switch 316 and its connection to the dedicated or shared BT port on the Wi-Fi/BT radio 312 such that the second antenna 318 is configured to operate with BLE signals. Exchange of the narrow-band continuous tone via the BLE beacon frames may then be conducted via the second antenna 318 and phase-based ranging from a phase shift may be used by the peripheral device locationing system of the distance and direction detection module 340 to determine a second distance r2 from second antenna 318 to peripheral device 338. This continuous tone exchange (CTE) may be conducted plural times and at varying narrow-band frequencies depending on the determined distance to increase range accuracy. The peripheral device locationing system of the distance and direction detection module 340 utilizes a known distance (d) between the first antenna 320 and the second antenna 318, as well as a reference plane determined from orientation and position sensor data of an integrated sensor hub, to determine an angle (θ) of direction for peripheral device 338. In a further embodiment, the peripheral device locationing system of the distance and direction detection module 340 may determine a directionality zone based on the angle θ for the detected peripheral device 338 relative to the user information handling system 300.

Figure 4:
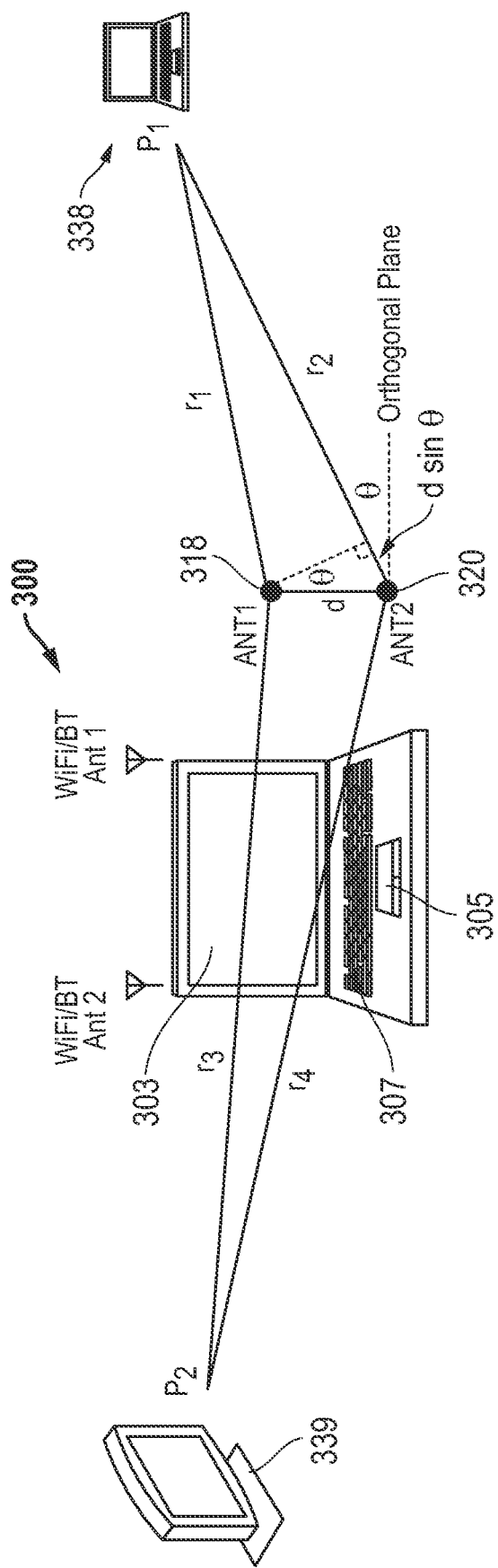
FIG. 4 is a close-up view of an information handling system and directions to one or more peripheral devices according to an embodiment of the present disclosure.

FIG. 4 is a detailed view of the information handling system 300 of FIG. 3 as it communicates with one or more nearby peripheral devices 338 or 339. As shown, the information handling system 300 may communicate with a single point of contact, $P_1$, at the nearby peripheral device 338 via the first antenna 318 to determine a range (i.e., distance), $r_1$, between the first antenna and $P_1$. In an embodiment, $P_1$, may be a BLE antenna at the nearby peripheral device 338. The information handling system 300 may also communicate with $P_1$ via the second antenna 320 to determine a range (i.e., distance), $r_2$, between the second antenna 320 an $P_1$. It is to be understood that the antennas 318, 320 at the information handling system 300 are spaced apart by a known distance, d. From this information, the distance and direction detection module 340 at the information handling system 300 may determine an angle, θ, to the nearby peripheral device 338. It is to be understood that θ may be measured between a line extending from the second antenna 320 at the information handling system 300 and $P_1$ at the nearby peripheral device, along $r_2$, and a plane that is orthogonal to a line extending through the first antenna 318 and the second antenna 320; specifically, $\theta = \arcsin[(r_2-r_1)/d]$.

As shown, the information handling system 300 may communicate with a single point of contact, $P_2$, at a second the nearby peripheral device 339 via the first antenna 318 to determine a range (i.e., distance), $r_3$, between the first antenna and $P_2$. In an embodiment, $P_2$, may be a BLE antenna at the nearby peripheral device 339. The information handling system 300 may also communicate with $P_2$ via the second antenna 320 to determine a range (i.e., distance), $r_4$, between the second antenna 320 an $P_2$. Again, it is to be understood that the antennas 318, 320 at the information handling system 300 are spaced apart by a known distance, d. From this information, the distance and direction detection module 340 at the information handling system 300 may determine an angle, θ, to the nearby peripheral device 339. It is to be understood that θ may be measured between a line extending from the second antenna 320 at the information handling system 300 and $P_2$ at the nearby peripheral device, along $r_3$, and a plane that is orthogonal to a line extending through the first antenna 318 and the second antenna 320; specifically, $\theta = \arcsin[(r_4-r_3)/d]$. Note that the depiction of the first antenna (ANT 1) 318 and second antenna 320 are shown in distinct locations from a location in user information handling system 300 for illustration purposes of ranges $r_1$, $r_2$, $r_3$, and $r_4$ and are not meant to depict a particular reference plane or orientation. It is understood that first antenna 318 and second antenna 320 may be located and integrated at any position within information handling system 300 and the reference plane and orientation may be determined by the distance and direction detection module executing thereon and with sensor hub input on position and orientation in some embodiments.

Accordingly, the direction and distance to the nearby peripheral devices 338 or 339 may be determined. The distance and direction detection module 340 at the information handling system 300 may transmit the direction and distance to the fluid transition rendering application 334 within the information handling system 300. The distance and direction to the nearby peripheral devices 338 or 339 may be used by the fluid transition rendering application 334 within the information handling system 300 to create a rendering of the nearby peripheral device 388 and the information handling system 300 for display on a display screen 303 of the information handling system 300. It is to be understood that the fluid transition rendering application 334 may render multiple devices relative to the information handling system 300 at different directions and distances relative to the information handling system 300. In another embodiment the fluid transition rendering application 334 may render the direction or distance of the nearby peripheral devices 338 or 339 relative to a cursor movement direction on a display screen 303 or relative to one or more I/O devices such as a touchscreen of the display screen 303, a touchpad 305, keyboard 307, or other I/O device for comparison of directionality with a received gesture direction from the I/O device or cursor control device. For example, a detected touch on a touchscreen or touchpad at a side or corner or a swipe gesture with a direction may be matched with a direction or direction zone for either peripheral device 338 or peripheral device 339 to determine if a distance and direction based operation is directed at either peripheral device. Further, other directional gestures or commands may be received, such as a directional keypress on a keyboard or determination of a location of a peripheral device 338 or 339 relative to user information handling system 300 before execution of a remote peripheral device operation such as a remote peripheral device authentication via biometrics or other functions according to various embodiments.

FIG. 5A, FIG. 5B and FIG. 5C depict a rendered pictorial sequence 500, 501, and 502 illustrating a method of transferring files via a catapult operation from an information handling system 510 to a peripheral device 538 utilizing a peripheral device locationing system of a distance and detection module according to an embodiment of the present disclosure. FIG. 5A through FIG. 5C illustrate a user information handling system 510 and a peripheral information handling system 538. In an embodiment, both may be displayed on a display device 503 on user information handling system 510. The process may begin with the user information handling system 510 utilizing antennas thereon and an antenna at the peripheral device 538 to execute a locationing direction, and in some embodiments a range, of the peripheral device 538 relative to the information handling system 510 as determined according to embodiments herein. The peripheral information handling system shown may be any peripheral device 538 or plural peripheral devices and may include other information handling systems as shown, display devices, audio devices, other I/O devices or displays or the like. For purposes of discussion in FIG. 5, peripheral device 538 may refer to a peripheral information handling system or any other peripheral device such as a peripheral display screen.

In an embodiment, the fluid transition rendering system may render an image of the peripheral information handling system 538 relative to an image of the user information handling system 510 and displayed on display screen 503 in an embodiment. In other embodiments, display screen 503 may indicate a direction (e.g., 527) for a peripheral device 538 or may have no indication because a user may locate the direction of the peripheral device which is detected by the peripheral device locationing system of a distance and detection module. Thus, rendering of the direction (or distance) of a peripheral device 538 relative to the display screen 503 or other I/O device of the information handling system may be conducted by a fluid transition rendering application operating thereon to display the same to the user on display screen 503. In one embodiment, the fluid transition rendering application may be utilized to indicate to a user the direction and distance of the peripheral device 538 determined by the peripheral device locationing system of a distance and detection module executing on the user information handling system 510.

The fluid transition rendering application may also include a rendering on display device 503 of one or more nearby peripheral information handling systems or other peripheral devices 538 to which the direction and distance has been determined as described herein by a distance and direction detection module operating within the user information handling system. The display device may further show a direction of a gesture to indicate a command involving the nearby peripheral information handling system or other peripheral device 538 as distinguished from other detected peripheral devices (not shown) located at other direction vectors or at different range distances. In other embodiments, the fluid transition rendering application may render a detected direction or distance of a detected peripheral device to an I/O device such as touchscreen on a display screen 503, a touchpad 505, or a keyboard 507 without necessarily displaying the rendered peripheral device as an image on display screen 503.

In a next step of the method, a user may use one or more input/output devices such as display screen 503 with a touchscreen, touchpad 505, a keyboard 507, a mouse, or other I/O device at the user information handling system 510 to execute a gesture or other command input with respect to a file 525 to be transferred and indicating a peripheral device 538 to receive the transfer. As shown, a user may select a file 525 that is rendered as a file image 524 on display screen 503 at the first information handling system 510 and drag the file image 524 toward the rendered peripheral information handling system 538 in one embodiment via an I/O device.

In another embodiment as shown in FIG. 5A, the user may select a file 525 that is rendered as a file image 524 on display screen 503 at the first information handling system 510 and execute a gesture via an I/O device such as display touchscreen 503, touchpad 505, or a key on keyboard 507. The executed gesture in the I/O device at information handling system may be executed toward a direction 527 of the peripheral device 538 as indicated by display on the display screen 503 or based on observation of direction to the peripheral device 538 by the user.

FIG. 5B shows a response to this gesture or other action by the user. The information handling system 510 may secure the file and securely transfer the file 525 from the user information handling system 510 to the nearby, peripheral information handling system 538. If there were multiple, nearby peripheral information handling systems 538, the user may swipe to the direction 527 of the particular, nearby peripheral device 538 to which the file 506 is intended to be shared as opposed to the direction of other peripheral devices. Further, a peripheral device range limitation may be required as well to limit transfers to devices within a specified distance and under control of the user of the information handling system. In one embodiment, the user or another user of the peripheral device 538 may indicate acceptance of the transferred file 525 via actuation of an accept command via an I/O device such as the display screen 533, touchpad 505, or keyboard 507 on the peripheral device 538 if available.

Proceeding to FIG. 5C, the peripheral device 538 may indicate the successful transfer of file 525 with a file icon indicator 526 or other displayed indicator at the peripheral device 538 such as on display screen 533. In one embodiment, an indication at the user information handling system 510 may also be displayed indicating successful transfer of file 525. At this point the method may end.

Figure 6B:
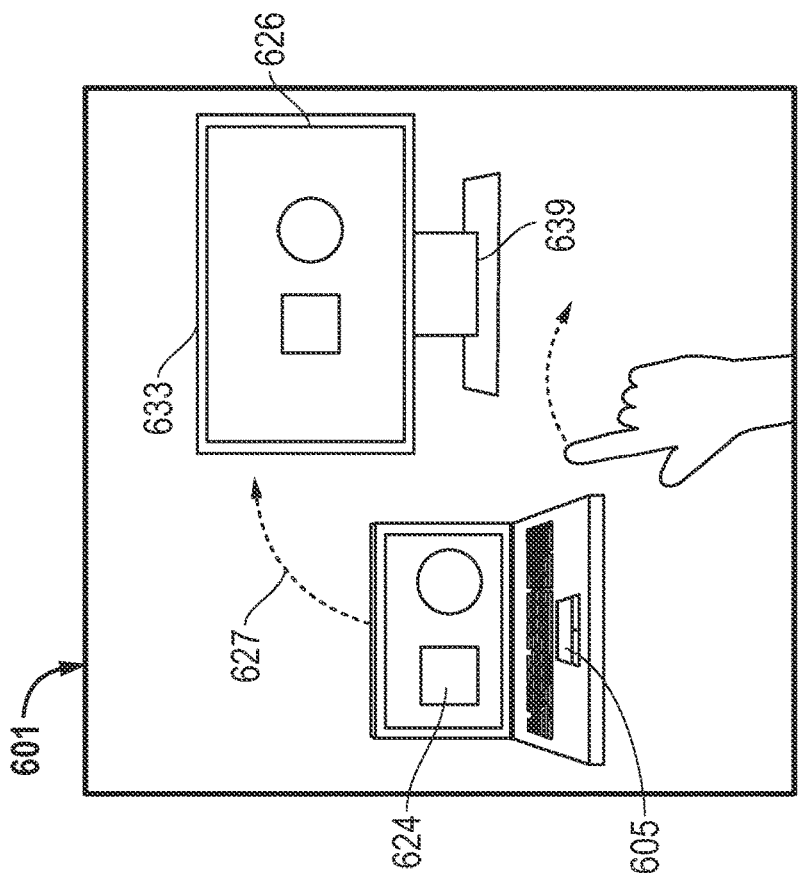
FIG. 6A and FIG. 6B are a pictorial sequence illustrating a method of sharing a screen image from an information handling system to a peripheral device according to an embodiment of the present disclosure.
Figure 6A:
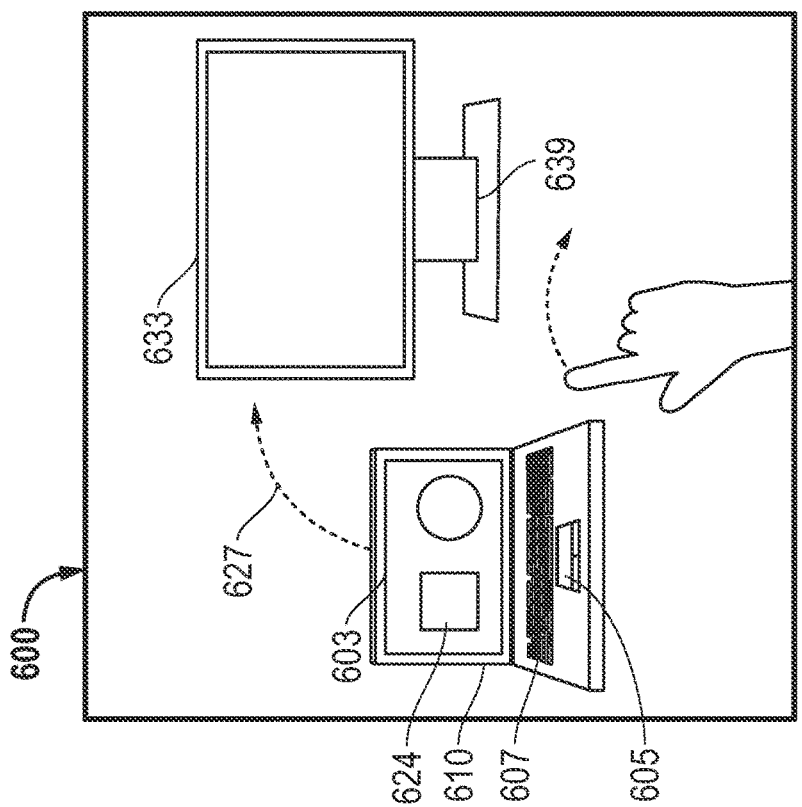

FIG. 6A and FIG. 6B depict a rendered pictorial sequence 600 and 601 illustrating a method of sharing a screen from a user information handling system 610 to a peripheral device 639 via fluid screen transition of image rendering according to an embodiment of the present disclosure. FIG. 6A through FIG. 6B illustrates the user information handling system 610 with a display device 603 having a rendering of an image 624 to be transferred to peripheral device 639 displayed thereon. In the shown embodiment, the peripheral device 639 is shown as an external display device but may be any peripheral device including another information handling system, a projector, or other system with display capabilities. The fluid screen transition of image rendering from image 624 displayed on the user information handling system 610 to the peripheral device 639 may be conducted by a fluid transition rendering application operating therein. The method may begin with the user information handling system 610 utilizing antennas thereon and an antenna at the peripheral device 639 to execute a peripheral device locationing system via a distance and direction detection module. The user information handling system may determine a direction 627, and in some embodiments a range, of the peripheral device 639 relative to the information handling system 610 as determined according to embodiments of execution of the distance and direction detection module herein. The display device 603 may also include a rendering of the nearby peripheral device 639 or an indication of the direction 627 or distance determined for the peripheral device 639 relative to the user information handling system 610.

As shown in FIG. 6A, in a next step of the method a user may select content 624 that is currently rendered at the user information handling system 610. Selection of content may be made by any I/O device associated with the user information handling system 610. The user may utilize one or more input/output devices such as display screen 603 with a touchscreen, touchpad 605, a keyboard 607, a mouse, or other I/O device at the user information handling system 610 to execute a gesture or other command input with respect to the rendered content 624 on display 603 to be transferred. The user may execute a gesture to indicate which peripheral device 639 is to have the rendered content shared with in a fluid screen transition rendering. As shown, a user may select the rendered image 624 or a portion thereof on display screen 603 at the first information handling system 610 and drag, swipe, or otherwise gesture the rendered image content 624 toward the direction 627 of the peripheral device 639 in one embodiment via an I/O device.

In response to this gesture at FIG. 6B, the user information handling system 610 may transfer the rendered image content 625 from the user information handling system 610 to the nearby peripheral device 639 to be displayed thereon. For example, the rendering display data may be transferred via secure wireless link to the peripheral device 639 for the peripheral device, e.g., the display screen to take the rendered display data, adjust to the new display device, and display the image content 626 thereon. The selection of the nearby peripheral device 639 allows for fluid and seamless sharing of display data for image content 624 with a nearby peripheral device 639 based on the detected directionality and range determined by the peripheral device locationing system on the distance and direction detection module of the user information handling system 610. If there were multiple nearby peripheral devices 639, the user could swipe to the particular nearby peripheral device based on directionality 627 to which the content 624 is intended to be shared as 626 and distinguished from other peripheral devices at different directions or beyond an acceptable range of distance from the user information handling system 610. At this point the method may end.

Figure 7C:
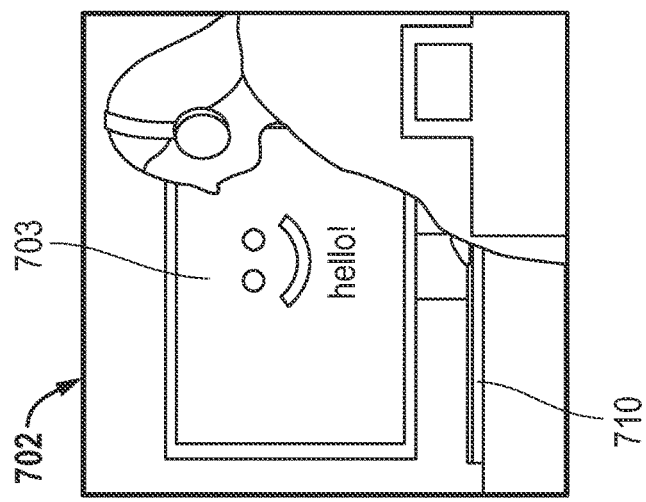
FIG. 7A, FIG. 7B, and FIG. 7C are a pictorial sequence illustrating a method of logging into an information handling system using a peripheral device according to an embodiment of the present disclosure.
Figure 7B:
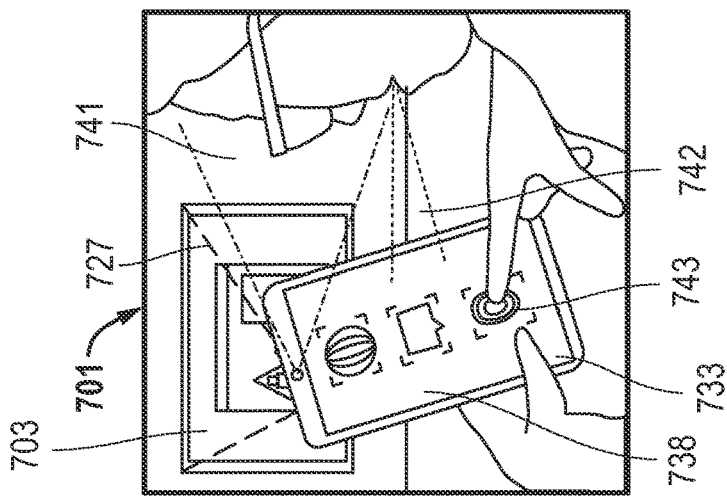
Figure 7A:
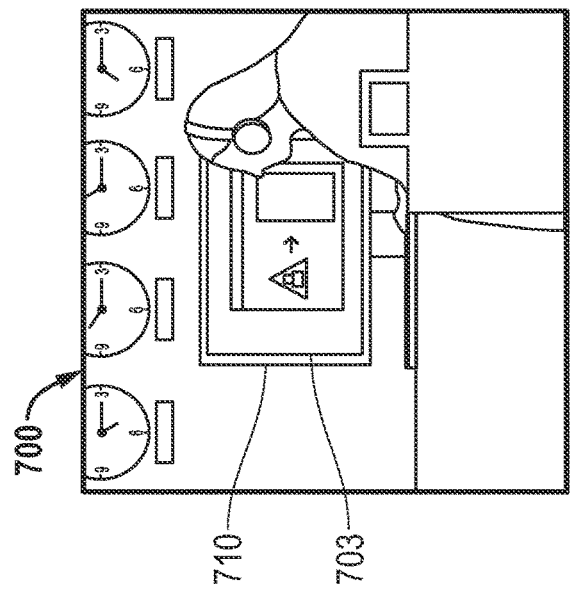

FIG. 7A, FIG. 7B, and FIG. 7C are a pictorial sequence 700, 701 and 702 illustrating a method of securely logging into a user information handling system 710 using a peripheral device 738 according to an embodiment of the present disclosure. As illustrated in FIG. 7A, the information handling system 710 may present an indication to a user to securely log into the information handling system 710 via a peripheral device 738, e.g., a smartphone, tablet or other peripheral system capable of working as an authenticating device for a user. As a first step, the user information handling system may detect a user in front of the information handling system 710 or display screen 703 with conventional methods including proximity detection, camera or infrared camera systems. Next, using the distance and direction detection module therein, the user information handling system 710 may execute a peripheral device locationing system to determine when the peripheral device 738 is moved into place in front of the information handling system 710, as shown in FIG. 7B. The front location and the proximity of the peripheral device 738 within a specified range of the user information handling system adds to security of the peripheral device authentication procedure in that the user may have better physical control and access to the peripheral device 738 and the user information handling system 710. Thereafter, the information handling system 710 may transmit a notice to the peripheral device 738 to activate a biometric sensor, e.g., a facial recognition sensor 741, a voice recognition sensor 742, a fingerprint sensor 743, a combination thereof, or some other appropriate biometric sensor. In a particular aspect, the peripheral device may only be sent the notice to activate the biometric sensor when the peripheral device is immediately in front of, or adjacent to a front, of the information handling system 702. Thus, the directionality and range of the peripheral device 738 as determined by the distance and direction detection module requires a particular direction and range that may be within control of a user. Then, the user may then interact with the biometric sensor at the peripheral device 738 in order to log into, or authenticate a log-in at, the user information handling system 710 via the peripheral device 738. Upon biometric verification, a response message may be transmitted to the user information handling system indicating authentication in an embodiment. If the response message indicates that the user is authorized to access the user information handling system 710, then access may be granted. As illustrated in FIG. 7C, then the user may access and utilize the user information handling system 710. At this point, the method may end.

Figure 8:
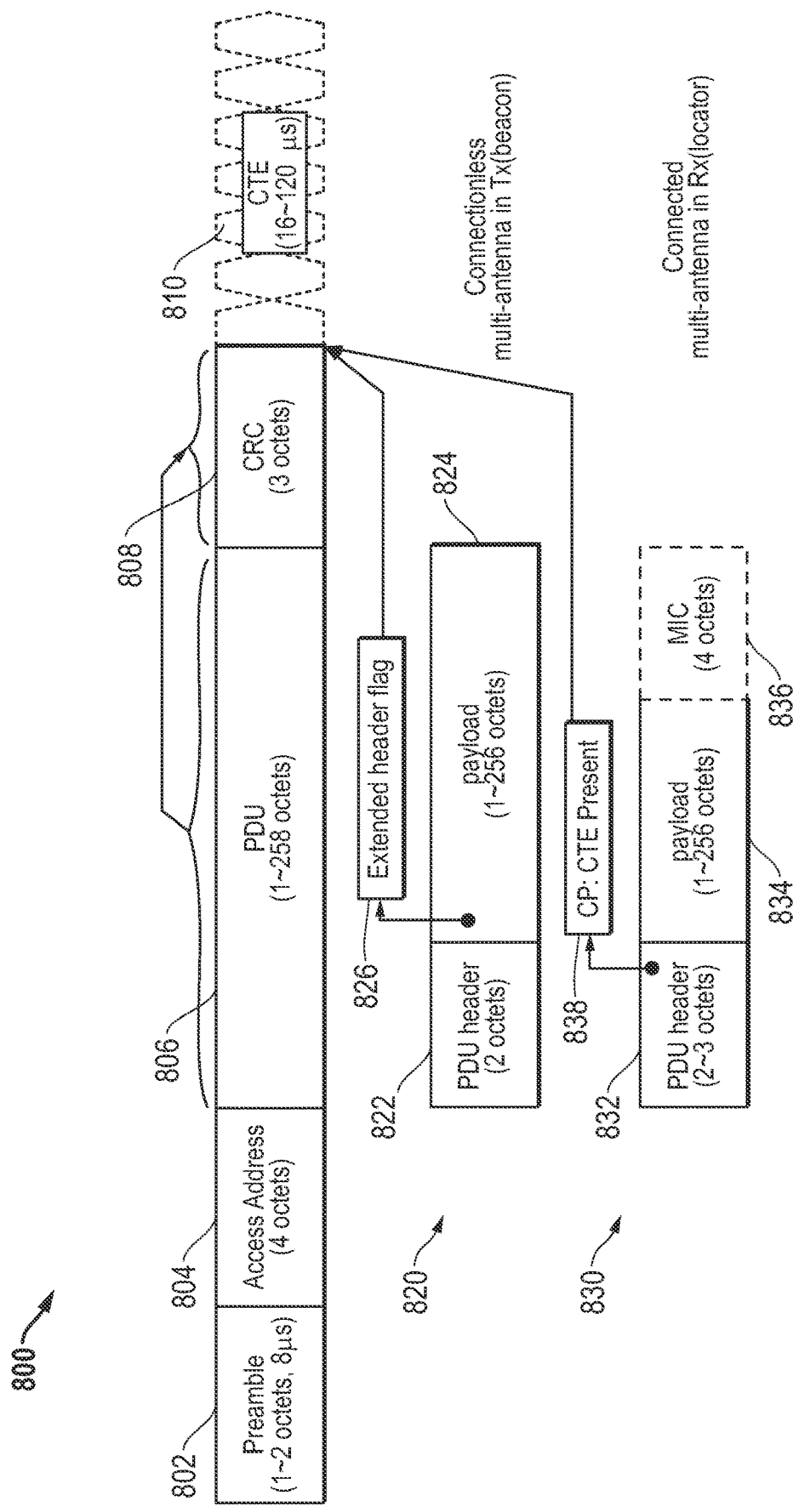
FIG. 8 is a diagram of a data signal beacon frame used to conduct phase-based ranging with a peripheral device according to an embodiment of the present disclosure.

FIG. 8 is a diagram of a wireless data signal, generally designated 800, that may be used to communicate with a peripheral device according to an embodiment of the present disclosure. In a particular embodiment, the wireless data signal may be a Bluetooth® Low Energy (BLE) beacon frame as shown in FIG. 8 and described herein. The BLE beacon frame is used to detect and communicate with nearby peripheral devices under the Bluetooth® Special Interest Group (BT SIG) standard with broadcast advertising packets such as the BLE beacon frame shown. Thus, pairing is not required for use of the BLE beacons to communicate at some level with other BLE devices such as peripheral devices in embodiments of the present disclosure. However, paired devices such as a user information handling system may also exchange BLE packets with similar BLE peripheral devices. The BLE technology is a low energy WPAN that permits utilization of similar frequency ranges, such as 2.4 GHz used with regular Bluetooth® under the IEEE 802.15 standard and also with Wi-Fi standards under IEEE 802.11. Thus, the BLE technology, as supported by the OS in an information handling system, may generate wireless connectivity among one or more information handling systems or peripheral devices, including low energy peripheral devices. Further, the BLE standard permits utilization with common wireless interface adapters and antennas as Wi-Fi and, thus, may be shared antenna systems.

As illustrated, the wireless data frame 800 may include a preamble 802. The preamble 802 may be one to two octets and may have a transmission time that takes approximately eight microseconds (8 μs). The data signal 800 may include an access address 804. The access address 804 may be four octets. Further, the wireless data signal 800 may include a protocol data unit (PDU) 806 that may be two to two hundred and fifty eight octets long. The wireless data signal 800 may also include a cycle redundancy check (CRC) that may be three octets long. Moreover, the wireless data signal 800 may have a constant tone extension (CTE) having a transmission time between sixteen and one-hundred and twenty microseconds (16-120 μs).

To facilitate distance measurement, in a particular embodiment according to the disclosure, additional data structures may be added to the BLE beacon data signal. For example, in a connectionless multi-antenna in transmission (beacon) mode for advertising and discovery, a first additional data set 820 may be added between the CRC 808 and the constant tone extension (CTE) portion 810. As shown, the first additional data set 820 may include a PDU header 822 that may be two octets long and a payload 824 that may be between one and two hundred and fifty six octets long. The payload 824 may include and extended header flag 826 indicating additional data is included in the BLE beacon. Such a BLE beacon transmission may be used to when a user information handling system is not paired with the peripheral device that is being assessed for direction and distance by the peripheral device locationing system executed by the distance and direction detection module of the user information handling system. On the other hand, in a connected multi-antenna in reception (locator) mode where the user information handling system and a target nearby peripheral device having BLE capability is paired, a second additional data set 830 may be added between the CRC 808 and the CTE 810. As shown, the second additional data set 830 may include a PDU header 822 that may be two to three octets long, a payload 824 that may be between one and two hundred and fifty six octets long, and a message integrity check (MIC) that is four octets long. The PDU header 832 may include a CP: CTE Present 838.

During operation, as described herein, a distance and direction detection module operating in an information handling system may use the wireless data signal 800 to determine the distance to a peripheral device that is connected/paired to the information handling system (using the second additional data set 830 as part of the wireless data signal 800) or to a peripheral device that is not connected/paired to the information handling system (using the first additional data set 820 as part of the wireless data signal 800). It is to be understood that the flag for using constant tone may be sent using connectionless beacons or connected data cannel PDU along with the constant tone.

Thus, the peripheral device locationing system of the distance and direction detection module may send a narrow band tone exchange via a constant tone at a particular frequency in the CTE of a discovery mode beacon (connectionless) or a locator mode (connected) to assess phase shift of the constant tone exchange from the user information handling system and the peripheral device. This constant tone transmission is reflected back to the user information handling system and phase shift of the constant tone transmission is used to determine distance from a first shared antenna. This process may be used to assess accurate distance from a first shared BLE antenna by the Wi-Fi/BT wireless interface adapter to a peripheral device with BLE capability and a BLE antenna for a target location.

The peripheral device locationing system of the distance and direction detection module may then cause the antenna switch, such as a DPDT switch, to switch the Wi-Fi/BT wireless interface adapter to have the BT port connect to a second shared antenna on the information handling system at a known distance from the first shared antenna. The peripheral device locationing system of the distance and direction detection module may repeat sending another constant tone transmission and detect the reflected back signal via a BLE packet, either connectionless or connected, for phase shift of the CTE. In this way, the peripheral device locationing system of the distance and direction detection module may assess accurate distance from a second shared BLE antenna by the Wi-Fi/BT wireless interface adapter on the user information handling system to the same peripheral device with BLE capability and the same BLE antenna for the target location. With the two accurate distances determined this way, and the known precise distance between the first shared antenna and the second shared antenna on the user information handling system, the directionality of the peripheral device may be determined relative to either or both of the first shared antenna or second shared antenna. This directionality may also be assessed relative to orientation and location input received from an integrated sensor hub detecting the position of the user information handling system and relative positions of the first shared antenna and second shared antenna. Then a directionality zone for the detected direction may be determined relative to any component on the information handling system such as I/O devices including a display screen with touchscreen, a touchpad, a keyboard, or the user information handling system generally.

The directionality and distance determined by the peripheral device locationing system of the distance and direction detection module may be used by a fluid transitioning rendering application to display a user information handling system relative to a detected peripheral device and direction to assist with gesture execution by a user in an embodiment. In another embodiment, the fluid transitioning rendering application may utilize the determined directionality and distance according to the above embodiment to indicate a direction of one or more peripheral devices on a display screen to assist with gesture utilization to perform a direction based operation for a software application executing on the user information handling system. With directionality and distance determined this way utilizing the wireless data signal 800, whether connected/paired or not, the peripheral device locationing system of the distance and direction detection module may then provide this directionality and distance or range for utilization with a user gesture detection module to detect whether a gesture lines up with the direction or direction zone of the peripheral device. Further, the peripheral device locationing system of the distance and direction detection module may provide this directionality or range to applications operating on the information handling system for use therein for various direction-based or range-based operations with a peripheral device. Software application direction-based or range-based functions may include, in example embodiments, a datafile catapult to a peripheral device, fluid screen transitioning to a peripheral device of rendered display images from a user information handling system, remote peripheral device sign-in or authentication for biometrics or other authentication, or other software applications utilizing directionality or range to a peripheral device to conduct interaction or expedient exchange of information based on direction or distance.

Figure 9:
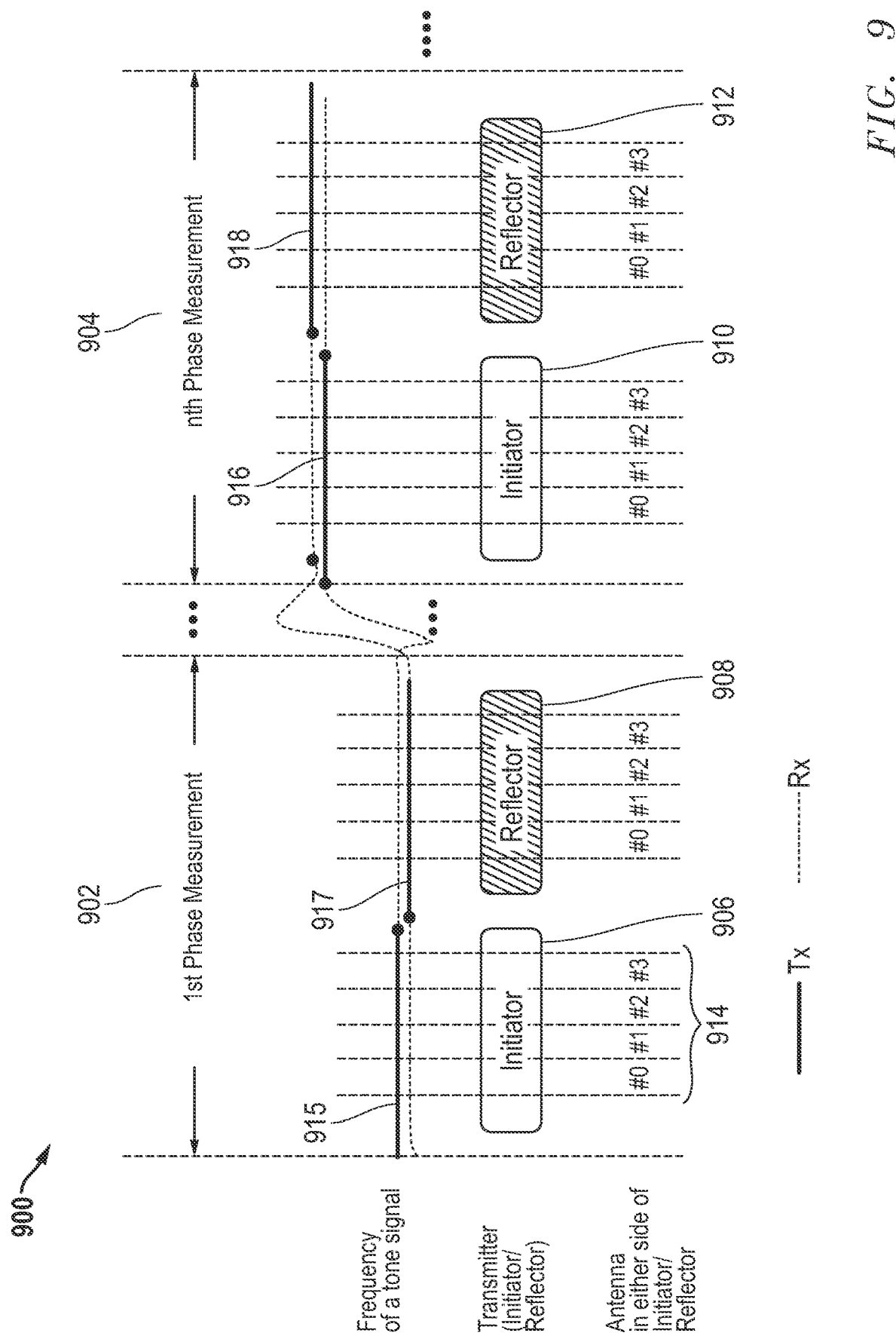
FIG. 9 is a diagram of a data transmission pattern used to conduct phase-based ranging with a peripheral device according to an embodiment of the present disclosure.

FIG. 9 is a diagram of a data transmission pattern 900 used to communicate with a peripheral device according to an embodiment of the present disclosure for determination of distances between a user information handling system and the peripheral device. As illustrated the pattern 900 may include a first phase measurement 902 and an Nth phase measurement 904. As shown, in the first phase measurement 902, an initiator 906 (transmitter) may send a series of one or more measurement beacons #0, #1, #2, #3. These measurements may be transmitted simultaneously or serially. The initiator 906 may be a transmitter BLE antenna such as a BT antenna at the user information handling system or may be a BT/Wi-Fi shared antenna in various embodiments. A reflector 908 may return the measurement beacons #0, #1, #2, #3 simultaneously or serially. The reflector 908 may be a BLE antenna such as a BT antenna or a shared BT/Wi-Fi antenna where applicable at a peripheral device. Similarly, the Nth phase measurement 904 may include the initiator 906 (transmitter) may sending a series of one or more measurement beacons #0, #1, #2, #3. These measurements may be transmitted simultaneously or serially. The reflector 908 may return the measurement beacons #0, #1, #2, #3 simultaneously or serially.

During operation, as described herein, a distance and direction detection module operating in a user information handling system may use the data transmission pattern 900 to determine the distance to a peripheral device relative to the user information handling system whether or not the peripheral device is connected to the information handling system. The data transmission pattern 900 may be used in a first phase measurement 902 through an Nth phase measurement 904 to constant tone signal (CTE) of a particular narrowband tone frequency 915, 916 to perform carrier phase ranging based on tone frequency phase shift of a reflected signal 917, 918. For example, a frequency phase shift may occur between the first initiated constant tone signal 915 and the first reflected signal 917 at the narrow band frequency. Similarly, a phase shift initiated constant tone signal 915 and the first reflected signal 917 at another narrow band frequency. The first phase measurement 902 through the Nth phase measurement 904 may be conducted over multiple narrow band continuous tone frequencies and using a plurality of antennas for range measurements. A greater number of phase measurements 902, 904 may be used for distances greater than a threshold distance, such as 1 meter. Post-processing of phase shift determined distances from a first BLE transmitting antenna and from a second BLE transmitting antenna may be used to determine the direction of the reflector BLE antenna, and the peripheral device, with respect to the initiator user information handling system according to embodiments herein. The direction measurement may be performed from either side in some embodiments, i.e., from the initiator or the reflector.

Figure 10:
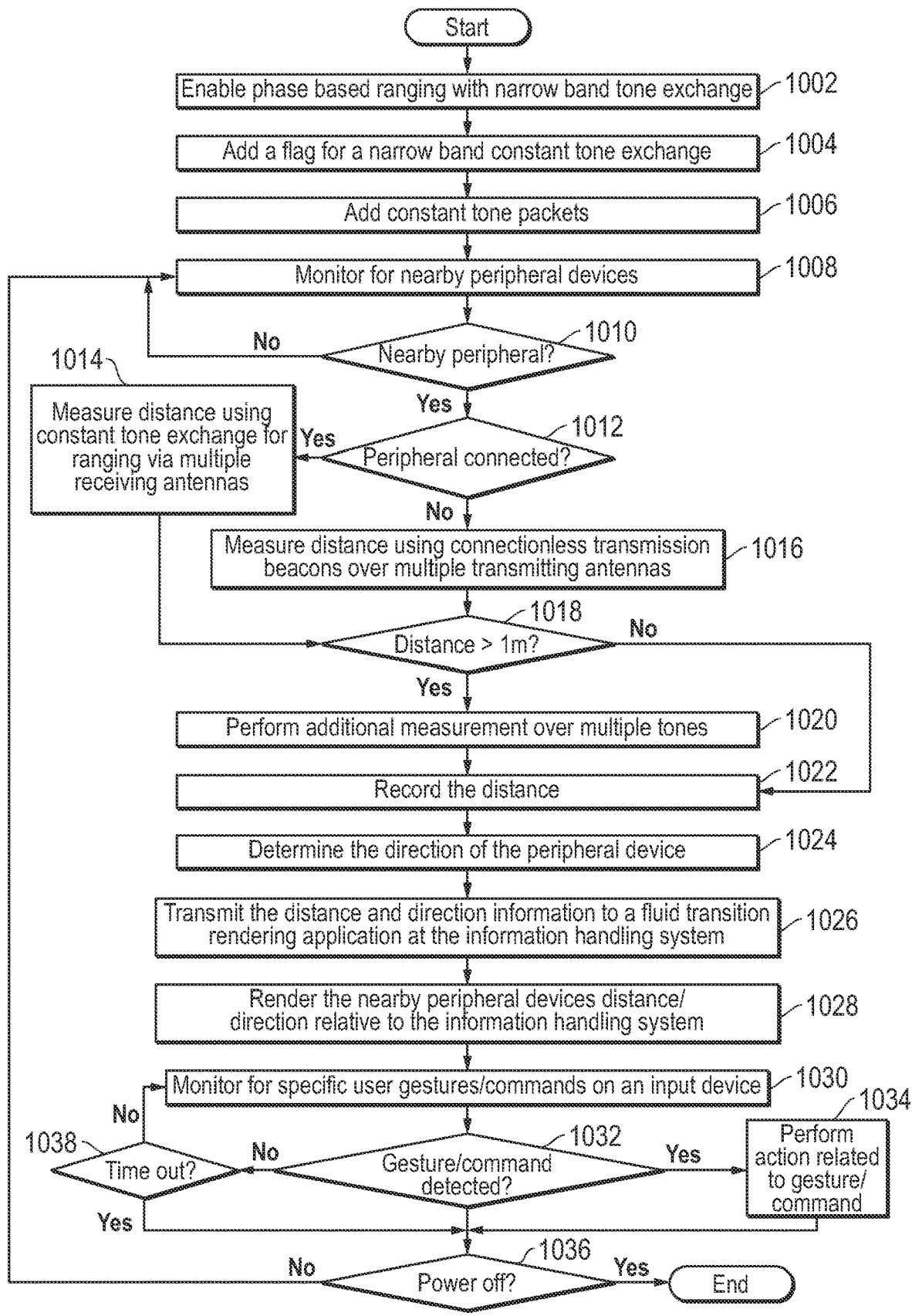
FIG. 10 is flow diagram illustrating a method of determining a distance and direction to a peripheral device relative to an information handling system using integrated system antennas within the information handling system according to an embodiment of the present disclosure.

FIG. 10 is flow diagram illustrating a method of determining a distance and direction to a peripheral device relative to a user information handling system using integrated system antennas within the user information handling system with a known spacing according to an embodiment of the present disclosure. Commencing at block 1002, the method 1000 may enable phase-based ranging with narrow band tone exchange. In an embodiment, the peripheral device locationing system of the distance and direction detection module may interface with a BT wireless interface adapter to utilize BLE system for low power packet transmissions from plural integrated BT antennas, shared BT/Wi-Fi antennas, or a combination. In an example embodiment, this phase-based ranging may utilize a BLE packet frame in beacon discovery mode for an unconnected/unpaired peripheral device or in locator mode for a connected/paired peripheral device via the BLE protocol as shown and described in FIG. 8. Further, the peripheral device locationing system of the distance and direction detection module may use the data transmission pattern 900 illustrated in FIG. 9 to deliver an initiator narrow-band constant tone frequency and detect a reflector narrow band constant tone frequency response from a BLE antenna at the peripheral device. In a particular embodiment, the minimum delta frequency of the channel spacing of the Bluetooth Low Energy (BLE) is 2 MHz and the phase shift folds with a periodicity of 75 m (with round-trip path having active reflection).

At block 1004, the method 1000 may utilize the BLE packet frame similar to that shown in FIG. 8. The peripheral device locationing system of the distance and direction detection module add a flag for a narrow band constant tone exchange. For example, the flag for the narrow band constant tone exchange may be added to the signal used for the phased based ranging. Further, the flag for narrow band constant tone exchange may be added to the Bluetooth Low Energy (BLE) advertisements of a wireless data signal in unconnected/unpaired BLE frames (beacon advertisement mode) or in data channel frames of a locator mode in an appended payload along with a duration of constant tone at a selected narrowband frequency as discussed in FIG. 8 and in FIG. 9.

At block 1006, the method 1000 may add constant tone duration for use with BLE beacon frames. For example, the constant tone duration may be added to the wireless data signal BLE beacon frames used for the phase base ranging as an extension of the advertisement packet on legacy advertisement channels, e.g., channel 37, 38, and 39 for unconnected/unpaired peripheral devices or on data channels for connected/paired peripheral devices. For example, the constant tone duration is provided at the end of the BLE beacon frame for a period of time. That period may be from 16-120 microseconds in an example embodiment. Further, the tone frequency may be sent as BLE channel numbers in the BLE PDU.

At block 1008, the method 1000 may monitor for nearby peripheral devices with which to conduct phase-based ranging using the BLE antennas and the peripheral device locationing system of the distance and direction detection module. For example, the information handling system may regularly transmit advertising beacons or "listen" for advertising beacons from other devices. Similarly, already connected/paired peripheral devices may be identified relative to the user information handling system. Moving to decision 1010, the method 1000 may determine whether a peripheral device is nearby. If not, the method 1000 may return to block 1008 and continue monitoring for peripheral devices as described. On the other hand, at decision 1010, if a peripheral device is nearby, the method 1000 may continue to decision 1012. At decision 1012, the method 1000 may determine whether the peripheral device is a connected or paired peripheral device with the user information handling system, i.e., is there active signal transmission between the user information handling system and the peripheral device. Similarly, the peripheral device locationing system of the distance and direction detection module may determine that a peripheral device is nearby from the advertising beacons, but which may not be connected/paired via BLE.

At decision 1012, if the peripheral is connected, the method 1000 may proceed to block 1014. At block 1014, the method 1000 may measure a distance between the information handling system and the peripheral device using constant tone exchange for ranging via multiple receiving antennas via the BLE beacon frames in data channels of the connected BLE link. The constant tone exchange (CTE) is reflected by a BLE antenna at the peripheral device, and a phase shift may be detected to indicate a distance range. Thereafter, the method 1000 may proceed to decision 1018. Returning to decision 1012, if the peripheral is not connected or paired, the method 1000 may proceed to block 1016. At block 1016, the method 1000 may measure the distance between the information handling system and the peripheral device using connectionless transmission beacons with constant tone exchange for ranging via multiple receiving antennas via the BLE beacon frames advertising mode in over the multiple transmitting antennas with a known distance from one another. From block 1016, the method 1000 may also continue to decision 1018.

At decision 1018 and upon determining a phase-shift ranging distance with the CTE signal to each of a first BLE antenna or shared antenna and a second BLE antenna or shared antenna at the user information handling system, the method 1000 may determine whether the distance between the information handling system and the peripheral device is less than one meter (1 m) or some other nearness threshold distance. If the distance between the information handling system and the peripheral device is greater than one meter, the method 1000 may continue to block 1020. At block 1020, the method 1000 may perform additional phase-shift ranging measurements over multiple tones to provide additional distance accuracy to the BLE antenna at the peripheral device from the first and second BLE or shared antennas integrated in the user information handling system. These addition measurements over the multiple tones may substantially increase the accuracy of the measured distances to each of the first BLE or shared antenna and the second BLE or shared antenna. Thereafter, the method 1000 may proceed to block 1022. Returning to decision 1018, if the distance between the information handling system and the peripheral device is less than one meter, the method 1000 may also proceed to block 1022 since the expected accuracy may be sufficient. At block 1022, the method 1000 may record the distance between the information handling system and the peripheral device. In particular, accurate distance measurement may be received from the peripheral device locationing system of the distance and direction detection module for a distance range between the peripheral device BLE antenna and the first BLE antenna or shared antenna integrated into the user information handling system. Similarly at block 1022, the system may record from the peripheral device locationing system of the distance and direction detection module the distance between the peripheral device BLE antenna and the second BLE antenna or shared antenna integrated into the user information handling system.

Moving to block 1024, the method 1000 may determine the direction of the peripheral device relative to the information handling system. The integrated sensor hub may provide location and orientation of the user information handling system relative to a reference point via a compass system, gyroscope, accelerometers, or other sensor inputs providing orientation of the user information handling system. The orientation and position of the user information handling system may also be used to determine a position of the first BLE antenna and the second BLE antenna on the user information handling system for the peripheral device locationing system of the distance and direction detection module. Further, the peripheral device locationing system of the distance and direction detection module will have information on the distance (d) between the known locations of the first BLE antenna and the second BLE antenna integrated in the user information handling system. In a particular example embodiment, the direction of the peripheral device may be expressed as an angle, θ, and θ may be determined using the following equation:

$$\theta = \arcsin[(r_2 - r_1)/d]$$

in which, $r_2$ is the distance between a second BLE antenna and the peripheral device;

$r_1$ is the distance between a first BLE antenna and the peripheral device; and d is the distance between the first antenna and the second antenna.

The peripheral device locationing system of the distance and direction detection module may process the received distance data for the first BLE antenna and the second BLE antenna according to the above and the received orientation and position data of the user information handling system to determine a directionality of the peripheral device. This direction may be an angle relative to the orientation or position of the user information handling system or any of its components positioned relative to the user information handling system. For example, the directionality of the peripheral information handling system may be determined relative to I/O devices in the user information handling system such as a display device (with touchscreen), a touchpad, a keyboard, a mouse or other component device of the information handling system. In a further embodiment, the peripheral device locationing system of the distance and direction detection module may assign a directionality zone to a peripheral device relative to the user information handling system or its components. This may be useful when plural peripheral devices are detected, and range and directionality are determined for those plural peripheral device. In an embodiment, the directionality zone, based on a direction angle of each of the plural peripheral devices, may be used to distinguish gestures and associated functions executed by a user from among the peripheral devices based on the direction of the gesture compared to a directionality zone. For example, two peripheral devices near a user information handling system and on opposite sides of a display screen may be separated into left and right directionality zones. Any number of plural directions or directionality zones are contemplated in embodiments herein.

Proceeding to block 1026, the method 1000 may transmit the determined distance and the direction information or a directionality zone to a fluid transition rendering application at the information handling system. Next at block 1028, the method 1000 may render the nearby peripheral device as an image on a display screen at the user information handling system. In another embodiments at block 1028, the method 1000 may utilize the fluid transition rendering application and the determined distance and direction information or directionality zones to render or display an indication of a direction of the one or more peripheral devices on the display screen of the use information handling system. In yet another embodiment, the fluid transition rendering application may provide for the direction and location of an action such as data file catapulting to another peripheral device information handling system or for fluid transition of display data of a rendered image to a peripheral device that is a display device, projector, or other system capable of displaying content.

At block 1030, the method 1000 may monitor for specific user gestures on an input device. For example, the gestures may include a single finger in a direction across a designated portion of a touch pad, two fingers in a direction across a designated portion of a touch pad, three fingers in a direction across a designated portion of a touch pad, a single finger swipe along or to a designated edge or corner of a touch pad, a two-finger swipe along or to a designated edge or corner of a touch pad, a three finger swipe along or to a designated edge or corner of a touch pad, et cetera in an embodiment. In another example embodiment, the gestures may include a single finger in a direction across a designated portion of a touchscreen, two fingers in a direction across a designated portion of a touchscreen, three fingers in a direction across a designated portion of a touchscreen or similar gesture action with a touchscreen. In another embodiment, the gestures may also include a single finger swipe or movement of a cursor toward a rendered image of the peripheral device on a display screen by any cursor control device such as the touch pad, touchscreen, mouse, joystick or other I/O device. Similarly, a two finger swipe toward the rendered image of a peripheral device on the display screen and a three finger swipe toward the rendered peripheral device, or other gestures may be utilized by a user to indicate a direction to be compared with a direction or directionality zone of the peripheral device relative to the user information handling system or its components such as its display screen.

At decision 1032, the method 1000 may determine whether a user gesture is detected and compared with the direction or directionality zone of a peripheral device. In an embodiment, the user gesture if detected may be compared to direction or directionality zone associated with any of a plurality of detected peripheral devices. If a user gesture is detected at decision 1032 and is corresponds to at least one detected peripheral device, the method 1000 may proceed to block 1034 where the method 1000 may perform the action related to the user gesture. For example, the action related to user gesture may be a file share or file transfer action in one embodiment. In another embodiment, the action related to the user gesture may include a screen share or content share action. In yet another embodiment, there may be a command detected at decision 1032 rather than a gesture. For example, a request to access a user information handling system operating a remote device biometric authentication system may be operating. A command may be received from the remote biometric authentication system to determine if a peripheral device is located within a directionality zone or within a range of the user information handling system. If comparison of the peripheral device direction, directionality zone, or distance meets the criteria of the remote device biometric authentication system, a command may be received to execute an action. The action may be for the peripheral device and the remote biometric authentication system to proceed to 1034 with executing biometric authentication and communicating that authentication result from the peripheral device to the user information handling system. Thereafter, the method 1000 may proceed to decision 1036 where the method 1000 may determine if the information handling system 1000 is powered off. When the information handling system is powered off, the method 1000 may end. Conversely, if the information handling system remains powered on, the method 1000 may return to block 1008 and continue as described herein.

Returning to decision 1032, if the method 1000 does not detect a user gesture or command, the method may proceed to decision 1038. At decision 1038, the method 1000 may determine whether a period of time between the peripheral device being detected and determination of the direction and distance for the fluid transition rendering application for application to a gesture or command with a software application has timed out. If not, the method 1000 may return to block 1030 to monitor for gestures or command from operating software applications for direction or range based operations and the method 1000 may continue as described herein. Conversely, if a time out occurs, the method 1000 may proceed to decision 1036 wherein the method 1000 may determine whether the information handling system is powered off. When the information handling system is powered off, the method 1000 may end. On the other hand, if the information handling system remains powered on, the method 1000 may return to block 1008 and continue as described herein.

It is to be understood that during operation, the antenna controller may switch between 2×2 Wi-Fi antennas for range measurements for either side, i.e., transmitter or receiver, between the two antennas. The radio may measure the associated ranges, $r_1$ and $r_2$, to a target responder peripheral device, P, and notifies the antenna controller via the CTE payload. A coexistence algorithm is used to interleave Wi-Fi and Bluetooth data for primary antenna access and is shared between Bluetooth and Wi-Fi. A dedicated coexistence radio interface may be connected to the antenna controller in order to notify of Bluetooth/Wi-Fi coexistent operation and to aid with Wi-Fi 2×2 antenna selection and switching. The antenna controller may configure the primary antenna and may perform ranging in order to determine the distance between the information handling system and peripheral devices. The direction of the peripheral device may be calculate using the range, or distance, from the target peripheral device's antenna and the distance, d, between the 2×2 Wi-Fi antennas, as described herein. The reference plane for direction may be determined from the location of the Wi-Fi antennas within the information handling system and the determined orientation and position of the information handling system. An orthogonal plane may be configured as a reference plane for the information handling system. This information may be stored along with antenna configuration information within the antenna controller.

The blocks of the flow diagram of FIG. 10 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Information handling systems, modules, resources, or programs that are in communication with one another need not be in continuous communication with each other, unless expressly specified otherwise. In addition, information handling systems, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
   a processor;
   a memory;
   a power management unit (PMU);
   at least two antennas;
   a wireless interface adapter with a radio operatively coupled to the at least two antennas;
   the processor executing code instructions for a distance and direction detection module therein, wherein the distance and direction detection module is configured to:
   enable phase-based ranging with a narrow band constant tone exchange;
   add at least one constant tone period to a wireless data signal;
   monitor for nearby peripheral devices; and
   measure at least two distances between the information handling system and an antenna at a nearby peripheral device using the at least two antennas with the wireless data signal having the at least one constant tone period by switching between the at least two antennas to conduct at least one phase based ranging operation with the narrow band constant tone exchange for each of the at least two antennas.

2. The information handling system of claim 1, further comprising:

the distance and direction detection module is configured to determines a direction to the nearby peripheral device at least partially based on the two different distances measured to the nearby peripheral device.

3. The information handling system of claim 1, wherein the distance and direction detection module is configured to measure the at least two distances using the constant tone exchange operation via the at least two antennas while the nearby peripheral device is connected to the information handling system and the at least two antennas are receiving while paired to the nearby peripheral device.

4. The information handling system of claim 3, wherein the at least two antennas transcieve a Bluetooth® Low Energy (BLE) beacon frame as the wireless data signal with appended narrow band constant tone exchange with the nearby peripheral device.

5. The information handling system of claim 1, wherein the distance and direction detection module configured to measure the at least two distances using the constant tone exchange operation via the at least two antennas via an advertising and discovery beacon while the nearby peripheral device is not paired for a wireless link.

6. The information handling system of claim 1, further comprising:
the direction and detection module performs configured to perform additional phase based ranging distance measurements when a distance to the nearby peripheral device is less than one meter.

7. The information handling system of claim 1, further comprising:
the distance and direction detection module configured to add at least one flag for narrow band constant tone exchange to the wireless data signal.

8. The information handling system of claim 1, further comprising:
The radio is a combined Bluetooth® (BT)/Wi-Fi radio with a BT/Wi-Fi coexistence interface and at least one of the at least two antennas is a shared antenna for BT and Wi-Fi wireless protocols.

9. A method implemented at an information handling system comprising:
monitoring for nearby peripheral devices;
enabling phase-based ranging with narrow band tone exchange (CTE) via a narrow band continuous tone appended for a duration to a Bluetooth® Low Energy (BLE) beacon frame;
adding a flag for the narrow band constant tone exchange to the BLE beacon frame; and
measuring a first distance between a first BLE enabled antenna at the information handling system and a peripheral device BLE enabled antenna at a nearby peripheral device using the BLE beacon frame having the narrow band continuous tone appended;
switching a BLE port on a radio to a second BLE enabled antenna at the information handling system;
measuring a second distance between the second BLE enabled antenna at the information handling system and the peripheral device BLE enabled antenna at the nearby peripheral device using the BLE beacon frame having the narrow band continuous tone appended; and
determining, via a processor executing code instructions of a distance and direction detection module, a direction to the nearby peripheral device at least partially based on the first distance and the second distance measured to the nearby peripheral device and a known distance between the first BLE enabled antenna and the second BLE enabled antenna.

10. The method of claim 9, wherein the nearby peripheral device is connected to the information handling system and the first distance is measured using a detected phase shift in the narrow band constant tone exchanged between the first BLE enabled antenna at the information handling system and the reflected tone from the peripheral device BLE enabled antenna.

11. The method of claim 9, wherein the nearby peripheral device is not paired to the information handling system and the distance is measured using a BLE beacon frame with an advertising and discovery mode transmitted to over the first and second BLE enabled antennas at the information handling system.

12. The method of claim 9, wherein the nearby peripheral device is paired to the information handling system and the distance is measured using a BLE beacon frame in data channels with a locator mode transmitted between the first and second BLE enabled antennas at the information handling system and the peripheral device BLE enabled antenna.

13. The method of claim 9, further comprising:
rendering a direction of the nearby peripheral device relative to a display of the information handling system.

14. The method of claim 9, further comprising:
monitoring for specific user gestures at an input device of the information handling system;
determining if at least one specific user gesture corresponds to a determined direction of the peripheral device; and
performing a direction-based action related to a specific user gesture when the specific user gesture is detected as corresponding to the determined direction of the peripheral device.

15. The method of claim 14, wherein the direction-based action includes a file share, a file transfer, a content share, a screen share, or a combination thereof.

16. An information handling system comprising:
a processor;
a memory;
a power management unit (PMU);
a first Bluetooth® Low Energy (BLE) antenna and a second BLE antenna;
a wireless interface adapter with a radio and an antenna controller operatively coupled to the first BLE antenna and the second BLE antenna via an antenna switch;
the processor executing code instructions determining a distance and direction to at least one peripheral device nearby the information handling system, wherein the processor is configured to:
enable phase-based ranging with narrow band continuous tone exchange (CTE);
add a flag for the narrow band CTE;
add a narrow band continuous tone appended for a duration to a BLE beacon frame; and
monitor for nearby peripheral devices;
the processor to measure a first distance between the first BLE antenna at the information handling system and a nearby peripheral device using the BLE beacon frame with the narrow band continuous tone appe
the antenna controller to switch the antenna switch for a BLE port on the radio to the second BLE antenna at the information handling system;

the processor to measure a second distance between the second BLE enabled antenna at the information handling system and the peripheral device BLE enabled antenna at the nearby peripheral device using the BLE beacon frame with the narrow band continuous tone appended; and the processor to determine a direction to the nearby peripheral device at least partially based on the first distance and the second distance measured to the nearby peripheral device and a known distance between the first BLE enabled antenna and the second BLE enabled antenna.

17. The information handling system of claim 16, wherein the processor determines a directionality zone relative to the direction to the nearby peripheral device for use with gesture detection from at least one input/output device to compare a gesture from a user with a directionality zone for the nearby peripheral device.

18. The information handling system of claim 16, wherein the processor executes a fluid transition rendering application to render the direction of the nearby peripheral device relative to at least one input/output device of the information handling system.

19. The information handling system of claim 16, further comprising:

the processor to monitor for specific user gestures at an input/output device of the information handling system, match a specific gesture to the direction of one target nearby peripheral device among a plurality of detected nearby peripheral devices each with determined directions; and perform a direction-based function of a software application with the one target peripheral device.

20. The information handling system of claim 19, wherein the direction-based function includes a file share to the one target nearby peripheral device, a file transfer to the one target nearby peripheral device, a content share to the one target nearby peripheral device, a screen share to the one target nearby peripheral device, or a combination thereof.

* * * * *